US012373982B2

(12) United States Patent
Kim

(10) Patent No.: US 12,373,982 B2
(45) Date of Patent: Jul. 29, 2025

(54) METHOD OF COMPENSATING DATA AND SYSTEM FOR COMPENSATING DATA USING SAME

(71) Applicant: MEDIT CORP., Seoul (KR)

(72) Inventor: Jin Young Kim, Seoul (KR)

(73) Assignee: MEDIT CORP., Seoul (KR)

( * ) Notice: Subject to any disclaimer, the term of this patent is extended or adjusted under 35 U.S.C. 154(b) by 399 days.

(21) Appl. No.: 17/851,056

(22) Filed: Jun. 28, 2022

(65) Prior Publication Data

US 2022/0414922 A1 Dec. 29, 2022

(30) Foreign Application Priority Data

Jun. 29, 2021 (KR) .................. 10-2021-0085087
Apr. 15, 2022 (KR) .................. 10-2022-0047115

(51) Int. Cl.
*G06V 10/12* (2022.01)
*G06T 7/00* (2017.01)
*G06T 7/73* (2017.01)
*G06V 10/50* (2022.01)

(52) U.S. Cl.
CPC .............. *G06T 7/73* (2017.01); *G06T 7/0012* (2013.01); *G06V 10/12* (2022.01); *G06V 10/50* (2022.01); *G06T 2207/10016* (2013.01); *G06T 2207/30036* (2013.01); *G06T 2207/30244* (2013.01)

(58) Field of Classification Search
CPC ..................................................... G06T 7/521
See application file for complete search history.

(56) References Cited

U.S. PATENT DOCUMENTS

| 2011/0287387 | A1 | 11/2011 | Chen et al. | |
| 2016/0313114 | A1* | 10/2016 | Tohme | H04N 13/257 |
| 2016/0377410 | A1 | 12/2016 | Becker et al. | |
| 2020/0060550 | A1 | 2/2020 | Pesach et al. | |
| 2023/0248473 | A1* | 8/2023 | Bercovici | A61C 13/20 |
| | | | | 700/98 |

FOREIGN PATENT DOCUMENTS

| CN | 108204790 A * | 6/2018 | ............. G01B 11/24 |
| CN | 112530020 A * | 3/2021 | ............. G06T 17/20 |
| EP | 1609437 A1 * | 12/2005 | ........... A61C 9/0053 |
| KR | 20150059472 A * | 6/2015 | |
| KR | 10-1743724 | 9/2016 | |
| KR | 10-2018-0015093 A | 2/2018 | |
| KR | 20200046789 A * | 5/2020 | |
| KR | 20210082884 A * | 7/2021 | |
| WO | 2018/069094 A1 | 4/2018 | |
| WO | 2020/156893 A1 | 8/2020 | |

OTHER PUBLICATIONS

Extended European Search Report mailed Dec. 8, 2022 from the European Patent Office for European Application No. 22181563.2.
Non-final Office Action mailed on Jan. 10, 2024 from the Korean Patent Office for Korean Application No. 10-2022-0047115.

* cited by examiner

*Primary Examiner* — Di Xiao
(74) *Attorney, Agent, or Firm* — Insight Law Group, PLLC; Seung Lee

(57) ABSTRACT

Proposed is a method of compensating data, the method including: acquiring a plurality of initial scan shots by scanning a target object onto which a predetermined pattern is projected; detecting a non-scan region on the basis of the plurality of initial scan shots; and acquiring at least one compensated scan shot by additionally scanning at least one portion of the target object when the non-scan region is detected.

17 Claims, 15 Drawing Sheets

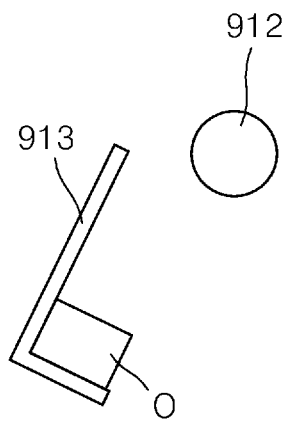 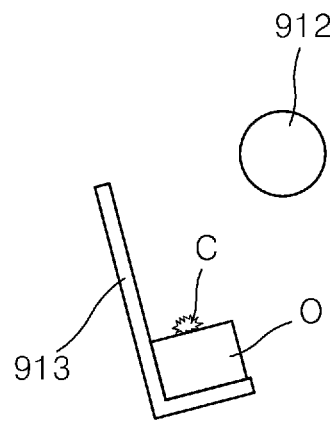 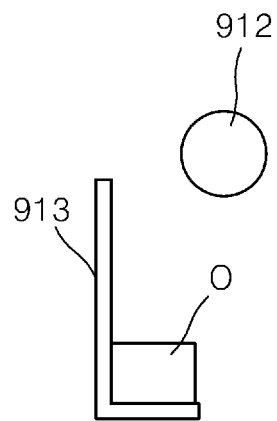
FIG. 15A     FIG. 15B     FIG. 15C
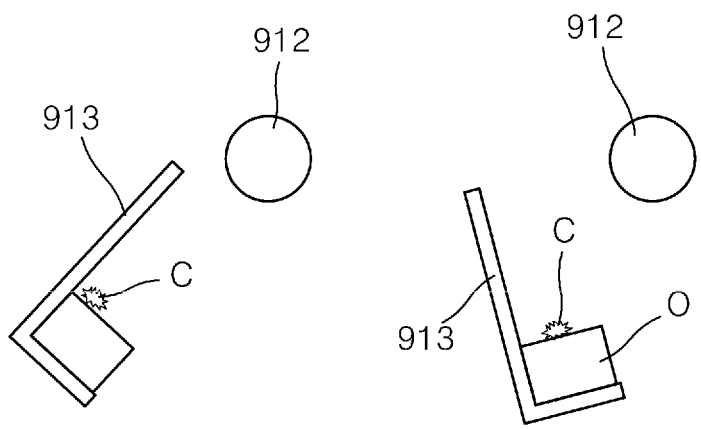
FIG. 16A     FIG. 16B

METHOD OF COMPENSATING DATA AND SYSTEM FOR COMPENSATING DATA USING SAME

CROSS-REFERENCE TO RELATED APPLICATIONS

This application claims the benefit of and priority to Korean Patent Application Nos. 10-2021-0085087, filed on Jun. 29, 2021; and 10-2022-0047115, filed on Apr. 15, 2022, the disclosure of which are herein incorporated by reference in their entirety.

BACKGROUND

1. Technical Field

The present disclosure relates to a method of compensating data and a system for compensating data using the method of compensating data and, more particularly, to a method of compensating data and a system for compensating data using the method of compensating data, the method and the system being capable of detecting a non-scan region of an initial three-dimensional model representing a target object and thus of acquiring a compensated three-dimensional model resulting from compensating the initial three-dimensional model. With the method and the system, a completion level of a three-dimensional model representing the object is improved.

2. Related Art

Three-dimensional scanning technologies have been used in various fields of industry, such as measurement, testing, reverse engineering, content generation, CAD/CAM for dental treatment, and medical equipment. With development in computing technology, an improvement in scanning performance has further increased the practical use of scanners. Particularly, the three-dimensional scanning technology is employed to provide dental treatment for a patient in the field of dental treatment, and thus, high precision is required of a three model acquired through three-dimensional scanning.

In a case where a three-dimensional scanner scans a target object (for example, a model that is cast from plaster of paris to duplicate a patient's oral cavity), a contour line of the target object may include a horizontal portion and a vertical portion. A sample target object P100 illustrated in FIG. 1 may include a dental portion P110 and a gingival portion P120. In addition, in the sample target object P100, a gingival lines H1 and H2 on which the dental portion P110 and the gingival portion P120 come into contact with each other, and a dental edge line H3 corresponding to an end portion of the dental portion P110 may have the shape of horizontal contour lines H, and inter-tooth lines (a line between two different teeth) may have the shape of vertical contour lines V, V1, V2, V3, V4, and V5.

The three-dimensional scanner may emit light, forming a predetermined shape, to the target object when scanning the target object to generate a three-dimensional model three-dimensionally representing the target object. The light may form a specific pattern in order to acquire depth information for three-dimensionally representing the target object as a three-dimensional model. As an example, the pattern may be a stripe pattern.

As illustrated in FIG. 2, in a case where the target object is scanned using light in a horizontal stripe pattern, a horizontal contour line of the target object that corresponds to a stripe-extending direction of the horizontal stripe pattern may be insufficiently scanned. Thus, a horizontal non-scan region HB, as empty space, may occur in a portion in the horizontal direction of the three-dimensional model (the three-dimensional model may correspond to an initial three-dimensional model 300 described below). As another example, as illustrated in FIG. 3, in a case where the target object is scanned using light in a vertical stripe pattern, a vertical contour line of the target object that corresponds to a stripe-extending direction of the vertical stripe pattern may be insufficiently scanned. Thus, a vertical non-scan region VB, as empty space, may occur in a portion in the vertical direction of the three-dimensional model. The three-dimensional model in which the non-scan region occurs has a low completeness level. Thus, there occurs a problem in that the presence of the non-scan region makes it difficult to precisely analyze a patient's dental cavity and that an orthodontic treatment object manufactured for providing a dental treatment to the patient has a low precision level.

Particularly, this problem may frequently occur in a specific type of three-dimensional scanner (for example, a table-type three-dimensional scanner). As an example, in a case where the target object is placed on the three-dimensional scanner and where a limited number of scan shots are acquired from a predetermined angle and in a predetermined direction, there occurs a problem in that the non-scan region occurs in a specific scan shot. In the specific type of three-dimensional scanner, the direction in which the target object is scanned and the angle from which the target object is scanned may be preset. Therefore, although a scanning process is repeatedly performed, the non-scan region may not be compensated for. That is, there is an increasing need to set a new direction and angle for the target object in order to compensate for the non-scan region.

Therefore, in order to solve the above-mentioned problems, research has been conducted on a method of acquiring a three-dimensional model in which a non-scan region is minimized.

PRIOR ART DOCUMENT

Patent Document (Patent Document) Korean Patent Application Publication No. 10-2018-0015093 (published on Feb. 12, 2018)

SUMMARY

An object of the present disclosure, which is made to solve the above-mentioned problems, is to provide a method of compensating data, the method being capable of acquiring a compensated three-dimensional model by acquiring a compensated scan shot and then compensating an initial three-dimensional model including a non-scan region.

Another object of the present disclosure is to provide a system for compensating data, the system for detecting and compensating for a non-scan region using the method of compensating data, as mentioned above.

The present disclosure is not limited to the above-mentioned object, and, from the following description, an object not mentioned above would be understandable to a person of ordinary skill in the art.

In order to accomplish the above-mentioned objects, according to an aspect of the present disclosure, there is provided a method of compensating data, the method including: acquiring, by a three-dimensional scanner, a plurality of initial scan shots by scanning a target object onto which a predetermined pattern is projected; detecting, by a control unit, a non-scan region on the basis of the plurality of initial scan shots; and acquiring, by the three-dimensional scanner, at least one compensated scan shot by additionally scanning at least one portion of the target object when the non-scan region is detected by the control unit.

The method may further include a different step. Accordingly, the non-scan region in the compensated three-dimensional model representing the target object can be minimized.

According to another aspect of the present disclosure, there is provided a system for compensating data, the system for performing the method of compensating data, the system including: a three-dimensional scanner including an optical projector and at least one camera arranged adjacent to one side of the optical projector and configured to acquire a plurality of initial scan shots and at least one compensated scan shot by the at least one camera scanning a target object onto which a predetermined pattern is projected by the optical projector; a control unit connected to the three-dimensional scanner and configured to adjust a direction and an angle of the target object with respect to the at least one camera by controlling the three-dimensional scanner; and a display unit configured to display a three-dimensional model of the target object generated on the basis of the plurality of initial scan shots and at least one compensated scan shot that are acquired through the three-dimensional scanner.

The system may further include a constituent element. Accordingly, the compensated three-dimensional model representing the target object can be easily acquired.

The user's use of the method of compensating data and the system for compensating data using the method according to the present disclosure makes it possible to acquire a compensated three-dimensional model resulting from compensating through a compensated scan shot acquired by scanning a non-scan region, occurring due to projecting of a specific pattern, in a pattern different from the specific pattern. Accordingly, the non-scan region in the compensated three-dimensional model is minimized. Thus, the advantage of improving a completion level of the compensated three-dimensional model can be achieved.

In addition, in a case where the non-scan region is detected in a plurality of initial scan shots before the initial three-dimensional model is acquired, the three-dimensional model is not redundantly generated. Thus, the advantage of saving a system source necessary to, and the time taken, to acquire an initial three-dimensional model can be achieved.

In addition, with various arrangements of the optical projector and the camera, a plurality of patterns may be projected onto a target object. Accordingly, the compensated three-dimensional model in which the non-scan region is minimized can be acquired, and the user can design an orthodontic treatment object using the precisely compensated three-dimensional model. Thus, the advantage of providing an optimal treatment to a patient can be achieved.

BRIEF DESCRIPTION OF THE DRAWINGS

FIGS. 15A, 15B, and 15C are views that are referred to for description of a compensation recommendation portion of the target object that corresponds to the non-scan region when a jig of a three-dimensional scanner that constitutes the system for compensating data according to the present disclosure is moved.

FIGS. 16A and 16B are views that are referred to for description of a process of additionally scanning the compensation recommendation portion of the target object.

DETAILED DESCRIPTION

Figure 1:
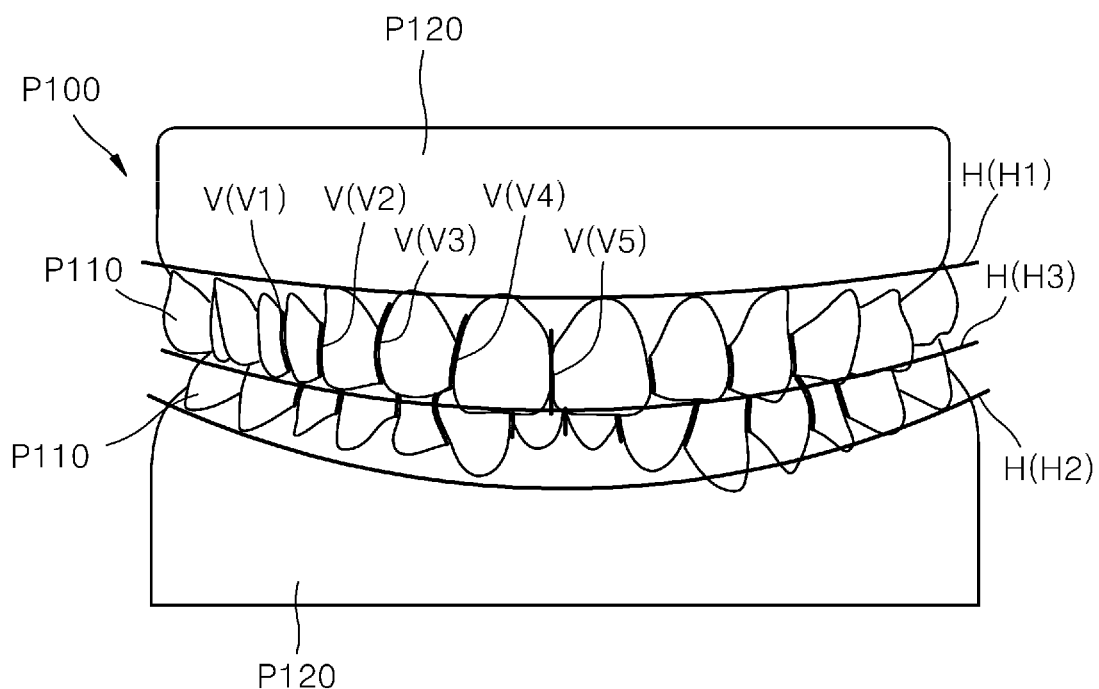
FIG. 1 is a view of a sample target object that is referred to for description of a horizontal contour line and a vertical contour line.
Figure 2:
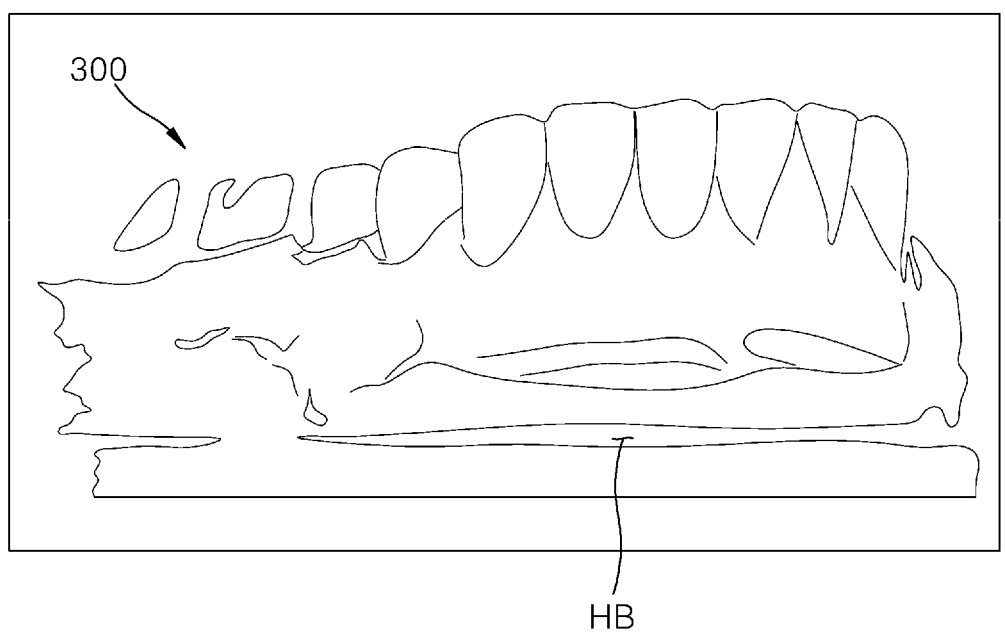
FIG. 2 is a view that is referred to for description of a non-scan region in the horizontal direction that occurs in a three-dimensional model.
Figure 3:
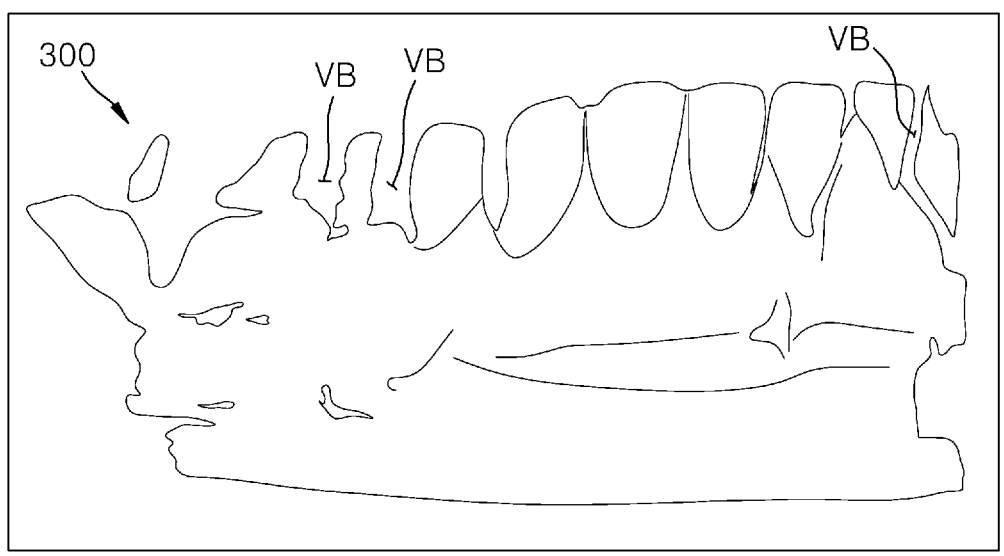
FIG. 3 is a view that is referred for description of a non-scan region in the vertical direction that occurs in the three-dimensional model.

Embodiments of the present disclosure will be described in detail below with reference to the drawings. It should be noted that the same constituent elements, although illustrated in different drawings, are given the same reference character, if possible, throughout the drawings. In addition, specific descriptions of a well-known configuration and function associated with the embodiments of the present disclosure will be omitted when determined as making the embodiments of the present disclosure difficult to understand.

The terms first, second, and so forth, the letters A, B, and so forth, and the letters in parentheses (a), (b), and so forth may be used to describe constituent elements according to each of the embodiments of the present disclosure. These terms and letters are used only to distinguish among the same constituent elements, and do not impose any limitation on the natures of the same constituent elements or the order thereof. In addition, unless otherwise defined, all terms, including technical or scientific terms, which are used in the present specification, have the same meanings as are normally understood by a person of ordinary skill in the art to which the present disclosure pertains. The term as defined in a dictionary in general use should be construed as having the same meaning as interpreted in context in the relevant technology, and, unless otherwise explicitly defined in the present specification, is not construed as having an ideal meaning or an excessively-formal meaning.

A method of compensating data according to a first embodiment of the present disclosure will be described in detail below.

Figure 4:
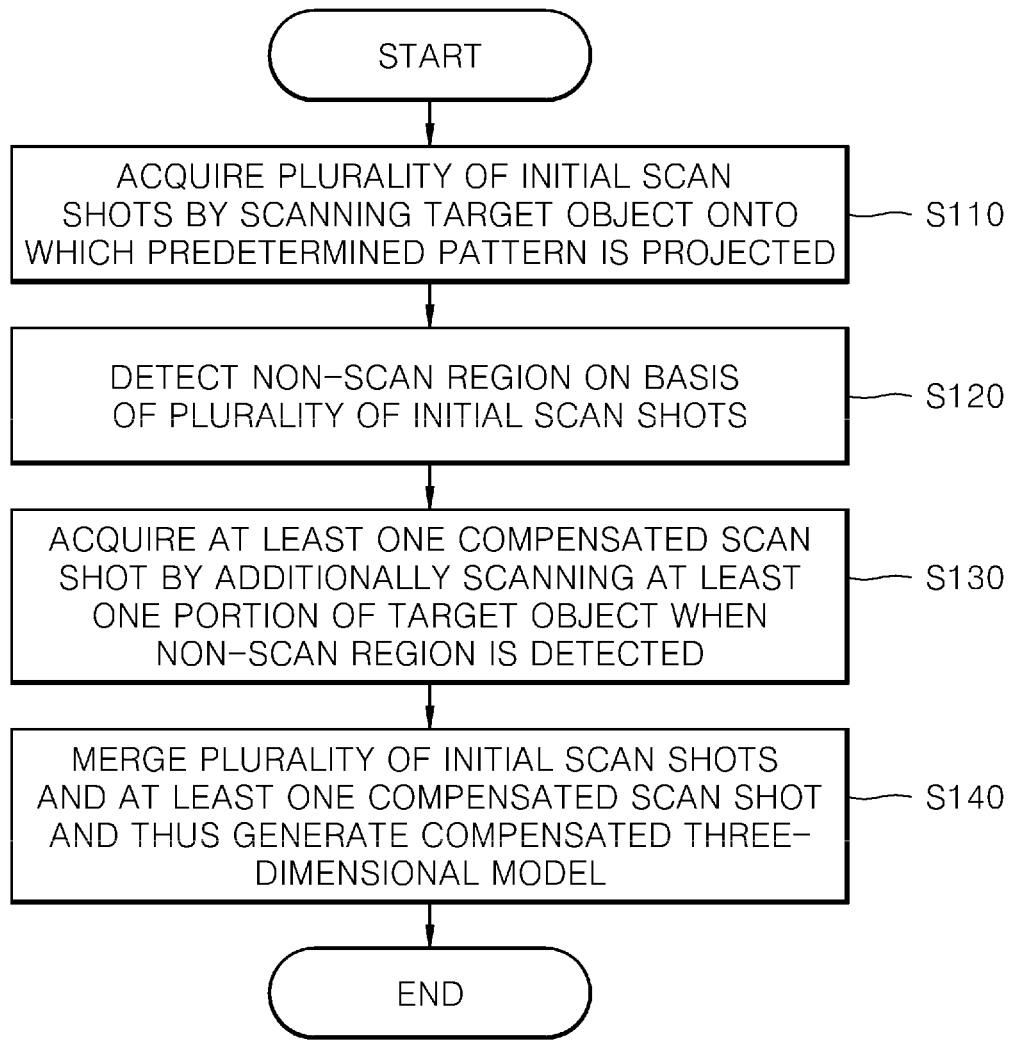
FIG. 4 is a flowchart illustrating a method of compensating data according to at least one embodiment among various embodiments of the present disclosure.

FIG. 4 is a flowchart illustrating the method of compensating data according to at least one embodiment among various embodiments of the present disclosure.

With reference to FIG. 4, the method of compensating data according to the first embodiment of the present disclosure may include Step S110 of performing initial scanning, Step S120 of detecting a non-scan region, Step S130 of performing compensative scanning, and Step S140 of generating a compensated three-dimensional model. In Step S110 of performing initial scanning, a three-dimensional scanner 910 may acquire a plurality of initial scan shots. In Step S120 of detecting a non-scan region, a control unit 920 may detect a non-scan region in an initial three-dimensional model generated from a plurality of initial scan shots or in each of the plurality of initial scan shots. In Step S130 of performing compensative scanning, the control unit 920 may acquire a compensated scan shot for minimizing the non-scan region, using a three-dimensional scanner 910. In Step S140 of generating a compensated three-dimensional model, the control unit 920 may generate a compensated three-dimensional model in which the non-scan region is minimized, by merging the plurality of initial scan shots and the compensated scan shot together.

Each step of the method of compensating data according to the present disclosure will be described in more detail below.

Figure 5:
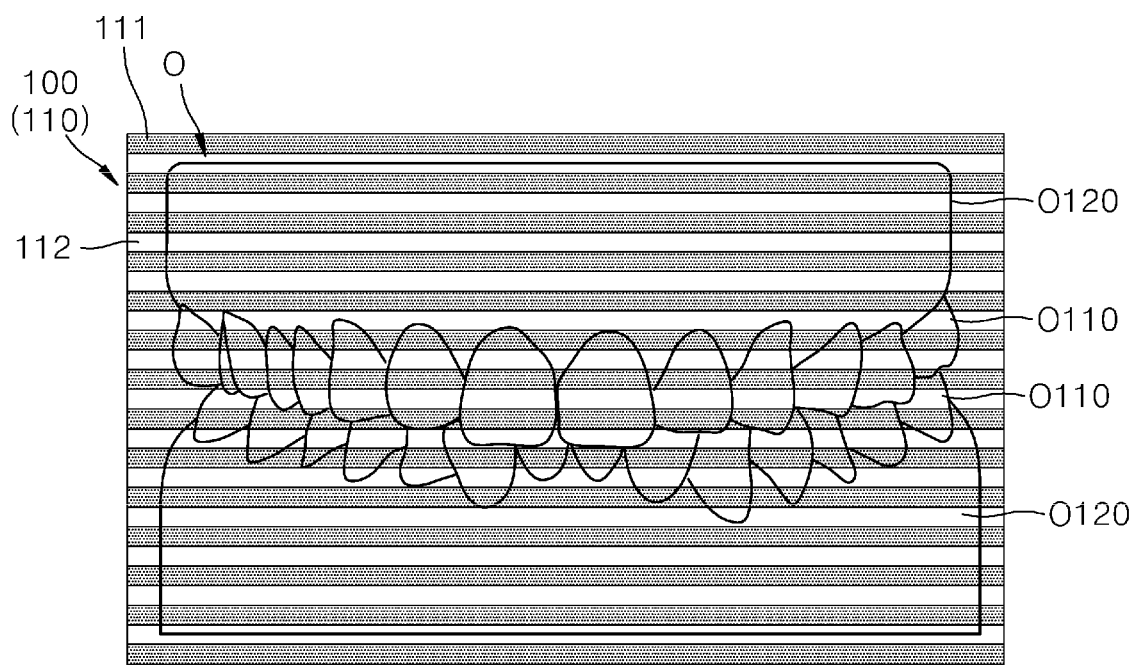
FIG. 5 is a view that is referred to for description of a state where a first pattern is projected onto a target object.
Figure 6:
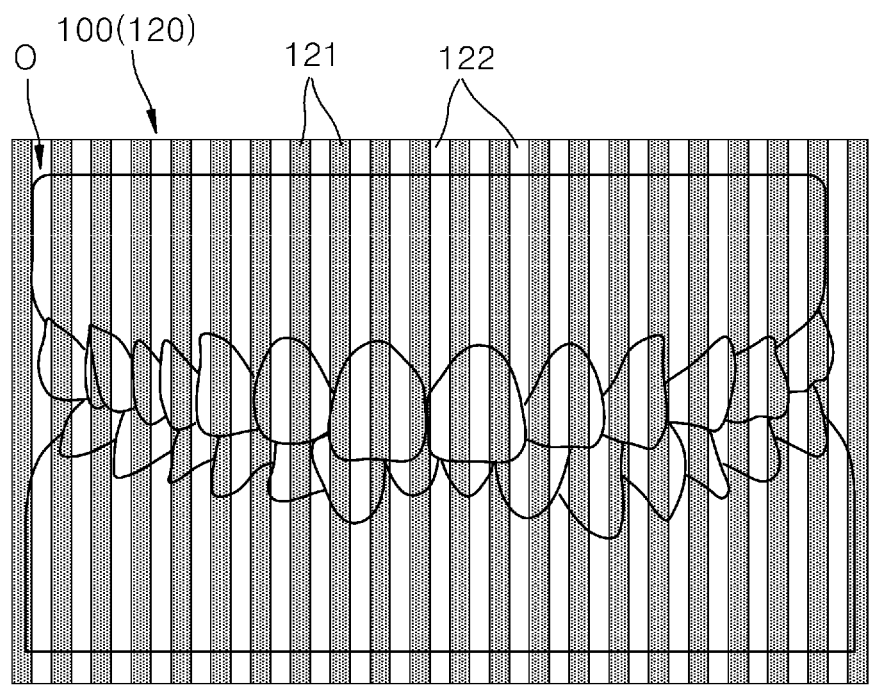
FIG. 6 is a view that is referred to for description of a state where a second pattern is projected onto the target object.

FIG. 5 is a view that is referred to for description of a state where a first pattern 110 is projected onto a target object O. FIG. 6 is a view that is referred to for description of a state where a second pattern 120 is projected onto the target object O.

With reference to FIGS. 4 to 6, Step S110 of performing initial scanning in the method of compensating data according to the present disclosure, the three-dimensional scanner 910 may acquire the plurality of initial scan shots by scanning the target object O onto which a predetermined pattern 100 is projected. In order to acquire a three-dimensional model three-dimensionally expressing the target object O, the three-dimensional scanner 910 may emit light, forming a predetermined shape, to a surface of the target object O. As an example, the light that the three-dimensional scanner 910 emits to the surface of the target object O may be pattern light forming the predetermined pattern 100. The predetermined pattern 100 may be a stripe pattern having a predetermined stripe-extending direction. Examples of the predetermined pattern 100 may include the first pattern 110. The first pattern 110 may have a shape in which a dark portion 111 and a bright portion 112 appear alternately. For example, the first pattern 110 may be a horizontal stripe pattern in which the dark portion 111 and the bright portion 112 extend in the horizontal direction and the dark portion 111 and the bright portion 112 are alternately arranged in the vertical direction. Examples of the predetermined pattern 100 may include the second pattern 120. The second pattern 120 may have a shape in which a dark portion 121 and a bright portion 122 appear alternately. For example, the second pattern 120 may be a vertical stripe pattern in which the dark portion 121 and the bright portion 122 extend in the vertical direction and the dark portion 121 and the bright portion 122 are alternately arranged in the horizontal direction.

Patterns 100 including the horizontal stripe pattern and the vertical stripe pattern may be generated by an optical projector 911 of the three-dimensional scanner 910. As an example, the optical projector 911 may include a light source that generates light and a pattern generation unit that is arranged between the light source and the target object. The pattern generation unit may be a pattern generation element that includes a pattern mask and a digital micromirror device (DMD). Accordingly, the light that is generated by the light passes through the pattern generation unit, and the pattern 100 corresponding to a shape of the pattern generation unit may be generated. The generated pattern 100 is projected onto the surface of the target object O. At this time, a portion of the surface of the target object O at which the light transmitted by the pattern generation unit arrives appears bright (the bright portion), and a portion of the surface of the target object O at which the light, not transmitted by the pattern generation unit, does not arrive appears dark (the dark portion).

The first pattern 110 and the second pattern 120 are described above as the vertical stripe pattern and the vertical stripe patters, respectively, but the present disclosure is not necessarily limited to these exemplary patterns. Two or more different patterns 100 that possibly minimize the non-scan region may be projected onto the surface of the target object O. Depth information of the target object O may be acquired through the pattern 100 projected onto the surface of the target object O, and a three-dimensional model (including an initial three-dimensional model and a compensated three-dimensional model) three-dimensionally representing the target object O may be acquired.

Figure 7:
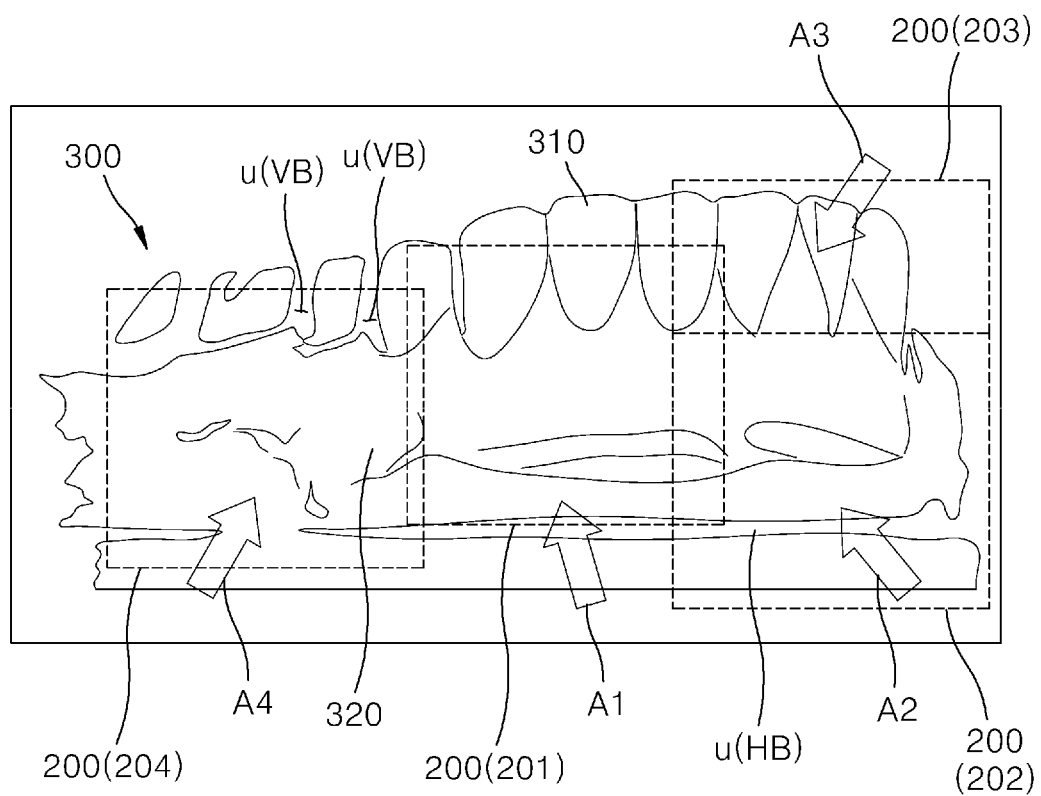
FIG. 7 is a view that is referred to for description of a relationship among initial scan shots for generating an initial three-dimensional model.

FIG. 7 is a view that is referred to for description of a relationship among a plurality of initial scan shots 200 for generating an initial three-dimensional model 300.

With reference to FIG. 7, in Step S110 of performing initial scanning, the three-dimensional scanner 910 may acquire the plurality of initial scan shots 200 by rotating and tiling the target object O and then scanning the target object O from various angles. As an example, the three-dimensional scanner 910 may acquire a first initial scan shot 201 by scanning a first portion of the target object O from a first angle A1 and may acquire a second initial scan shot 202 by scanning a second portion of the target object O from a second angle A2. In addition, the three-dimensional scanner 910 may acquire a third initial scan shot 203 by scanning a third portion of the target object O from a third angle A3 and may acquire a fourth initial scan shot 204 by scanning a fourth portion of the target object O from a fourth angle A4. At this time, at least one of portions of the target object O that are represented by the plurality of initial scan shots 200, respectively, may be different from the others, and at least one of angles with respect to the target object O may be different from the others. That is, the plurality of initial scan shots 200 may be acquired by scanning the target object O using different portions of the target object O and/or different angles with respect to the target object O. The initial three-dimensional model 300 may be generated by aligning and merging the plurality of initial scan shots 200. The initial three-dimensional model 300 may three-dimensionally represent the target object O, and the initial three-dimensional model 300 may include a dental model 310 and a gingival model 320.

The generated initial three-dimensional model 300 may include a non-scan region u. As illustrated in FIG. 7, with the second initial scan shot 202, the initial three-dimensional model 300 may include a horizontal non-scan region HB, and, with the fourth initial scan shot 204, the initial three-dimensional model 300 may include the vertical non-scan region VB. As an example, the second initial scan shot 202 may be acquired by the three-dimensional scanner 910 by projecting the first pattern 110 onto the target object O, and the fourth initial scan shot 204 may be acquired by the three-dimensional scanner 910 by projecting the second pattern 120 onto the target object O. That is, the horizontal non-scan region HB corresponding to the second initial scan shot 202 may be formed along a stripe-extending direction of the horizontal stripe pattern, and the vertical non-scan region VB corresponding to the fourth initial scan shot 204 may be formed along a stripe-extending direction of the vertical stripe pattern.

Therefore, there is a need to compensate for the horizontal non-scan region HB of the initial three-dimensional model 300 corresponding to the second initial scan shot 202 and for the vertical non-scan region VB of the initial three-dimensional model 300 according to the fourth initial scan shot 204.

After Step S110 of performing initial scanning is performed, Step S120 of detecting a non-scan region may be performed. In Step S120 of detecting a non-scan region, the control unit 920 may detect the non-scan region u on the basis of the plurality of initial scan shots 200. As an example, a non-scan region detection unit 925 of the control unit 920 may detect the non-scan region u in the initial three-dimensional model 300 generated by merging the plurality of initial scan shots 200. When the non-scan region u of the initial three-dimensional model 300 is detected, at least one compensated scan shot that is an additional scan shot for compensating for the non-scan region u may be acquired. Accordingly, a three-dimensional modeling unit 924 of the control unit 920 may additionally merge the compensated scan shot to the initial three-dimensional model 300. Thus, the compensated three-dimensional model may be generated and the non-scan region u of the compensated three-dimensional model may be minimized.

As another example, the non-scan region u may be detected in each of the plurality of initial scan shots 200. That is, the non-scan region u may be detected before the initial three-dimensional model 300 is generated. When the non-scan region u is detected in the plurality of initial scan shots 200, under the control of a three-dimensional scanner controller 922 of the control unit 920, the three-dimensional scanner 910 may acquire at least one compensated scan shot that is an additional scan shot for compensating for the non-scan region u. Accordingly, the compensated scan shot may be merged to the plurality of initial scan shots 200. Thus, the compensated three-dimensional model may be generated, and the non-scan region u of the compensated three-dimensional model may be minimized.

Step S130 of performing compensative scanning will be described below.

Figure 8:
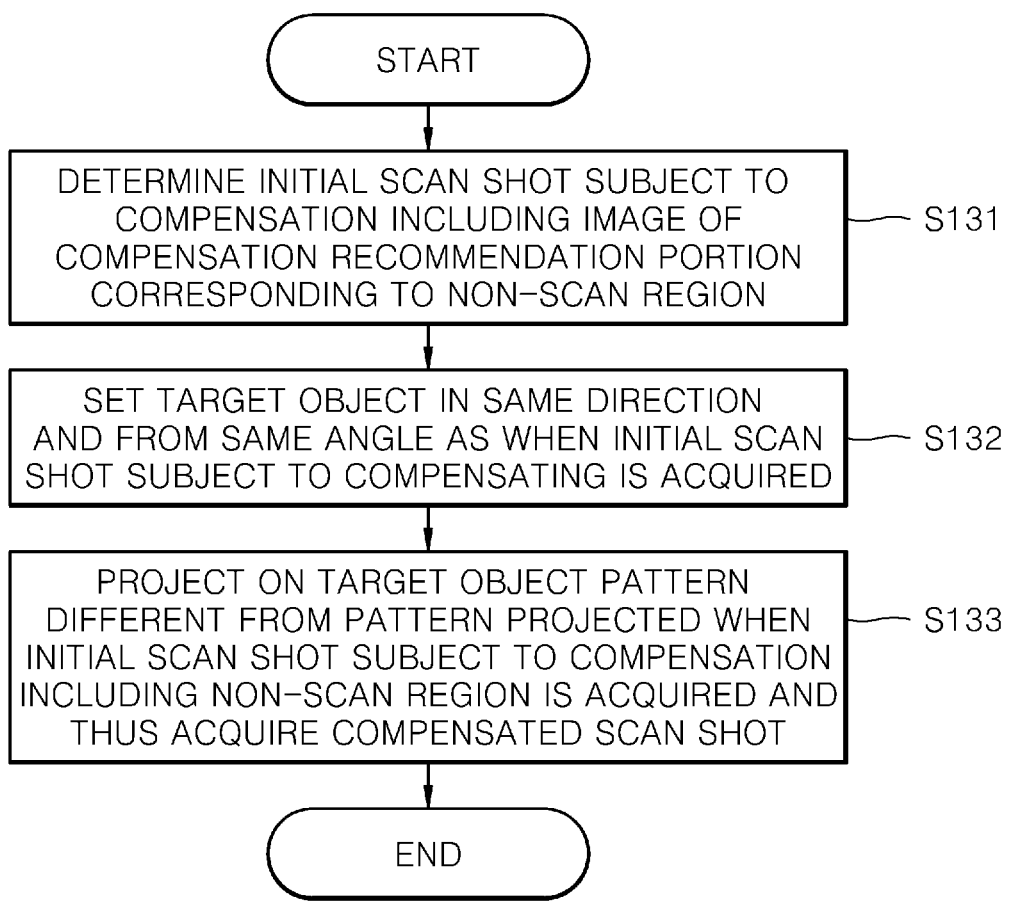
FIG. 8 is a flowchart illustrating sub-steps of Step of performing compensative scanning in the method of compensating data according to at least one embodiment among various embodiments of the present disclosure.

FIG. 8 is a flowchart illustrating sub-steps of Step S130 of performing compensative scanning in the method of compensating data according to the first embodiment of the present disclosure.

With reference to FIGS. 4, 7, and 8, in Step S130 of performing compensative scanning in the method of compensating data according to the present disclosure, when the non-scan region u is detected, the control unit 920 may acquire at least one compensated scan shot by additionally scanning at least one portion of the target object O using the three-dimensional scanner 910. More specifically, Step S130 of performing compensative scanning may include Step S131 of determining an initial scan shot subject to compensation. In Step S131 of determining an initial scan shot subject to compensation, the non-scan region detection unit 925 of the control unit 920 may determine the initial scan shot subject to compensation that includes an image of a compensation recommendation portion corresponding to the non-scan region u. When the initial scan shot subject to compensation is determined, Step S132 of setting a target object may be performed. In Step S132 of setting a target object, the target object O may be set in the same direction and from the same angle as when under the control of the three-dimensional scanner controller 922 of the control unit 920, the three-dimensional scanner 910 acquires the initial scan shot subject to compensation. As an example, in a case where the initial scan shot subject to compensation is a second scan shot 202, the three-dimensional scanner 910 may set the target object O in such a manner as to scan the second portion of the target object O from the second angle A2. As another example, in a case where the initial scan shot subject to compensation is a fourth scan shot 204, the three-dimensional scanner 910 may set the target object O in such a manner as to scan the fourth portion of the target object O from the fourth angle A4.

As still another example, in a case where the initial scan shot subject to compensation is the second scan shot 202, the three-dimensional scanner 910 may set the target object O in such a manner as to scan the second portion of the target object O from a new angle different from the second angle A2. In this case, although a pattern that is the same as the initial scan shot subject to compensation is projected onto the target object O, the compensated scan shot through which the non-scan region u is compensated for may be acquired.

Step S130 of performing compensative scanning may further include Step S133 of acquiring a scan shot associated with a different pattern. In Step S133 of acquiring a scan shot associated with a different pattern, under the control of the three-dimensional scanner controller 922 of the control unit 920, the three-dimensional scanner 910 may acquire the compensated scan shot by projecting onto the target object O a pattern different from the pattern projected when acquiring the initial scan shot subject to compensation that includes the non-scan region u. As an example, in a case where the initial scan shot subject to compensation is acquired by scanning the target object O onto which the first pattern 110 is projected, the compensated scan shot may be acquired by scanning the target object O onto which the second pattern 120 different from the first pattern 110 is projected. Accordingly, the non-scan region u occurring due to the first pattern 110 may be compensated for through the compensated scan shot acquired by scanning the target object O onto which the second pattern 120 is projected.

When the compensated scan shot is acquired, Step S140 of generating a compensated three-dimensional model may be performed. As an example, in Step S140 of generating a compensated three-dimensional model, an alignment unit 923 and the three-dimensional modeling unit 924 of the control unit 920 may additionally merge the compensated scan shot to the initial three-dimensional model 300 and thus may generate the compensated three-dimensional model. As another example, in a case where the non-scan region u is detected in the plurality of initial scan shots 200, the compensated three-dimensional model may be generated by merging the compensated scan shot to the plurality of initial scan shots 200. The non-scan region u may be minimized in the compensated three-dimensional model resulting from the compensation through the compensated scan shot. A user can advantageously provide an optimal dental treatment to a patient using the compensated three-dimensional model precisely representing the target object O.

A process of acquiring the plurality of initial scan shots 200, a process of acquiring the compensated scan shot, and a process of generating the compensated three-dimensional model will be described below with reference to various practical examples.

Figure 9:
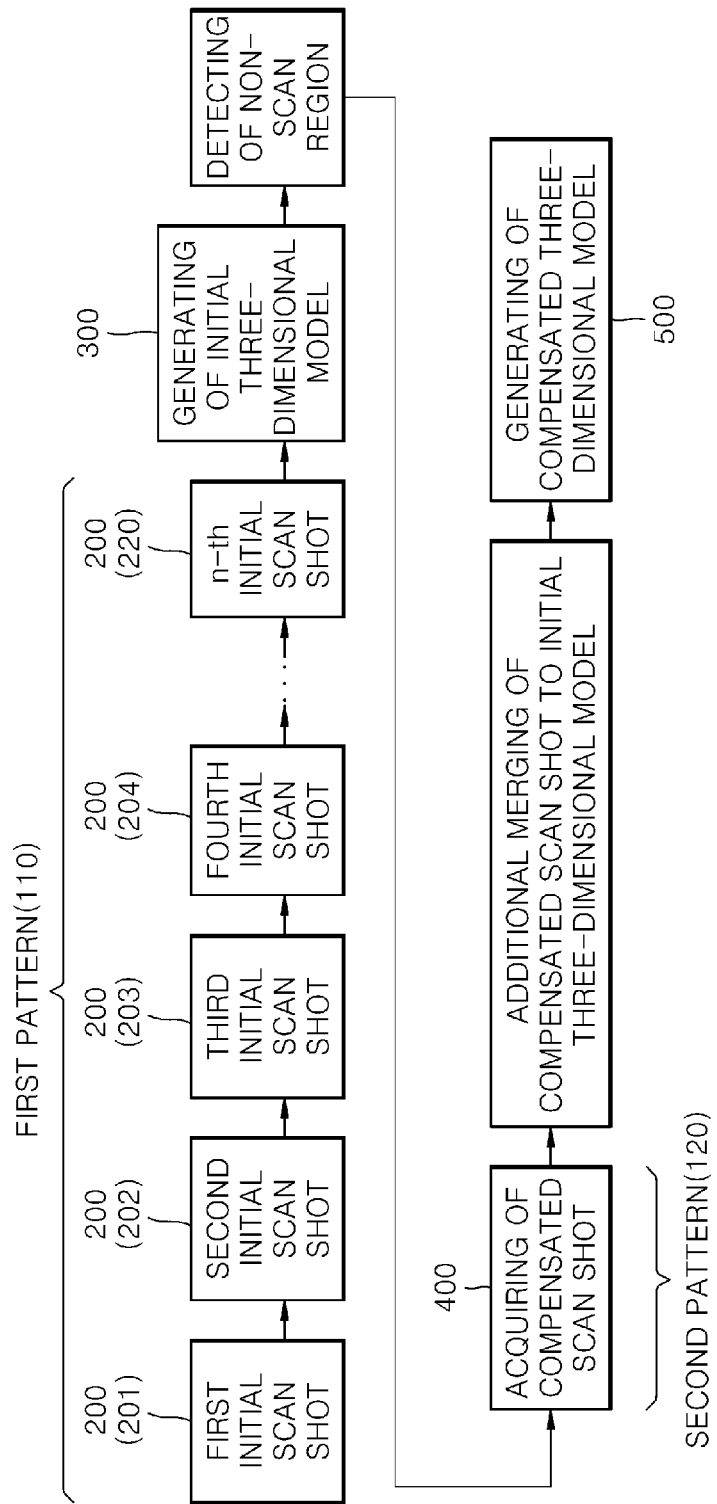
FIG. 9 is a diagram that is referred to for description of a process of generating a compensated three-dimensional model in a method of compensating data according to a first embodiment of the present disclosure.
Figure 10:
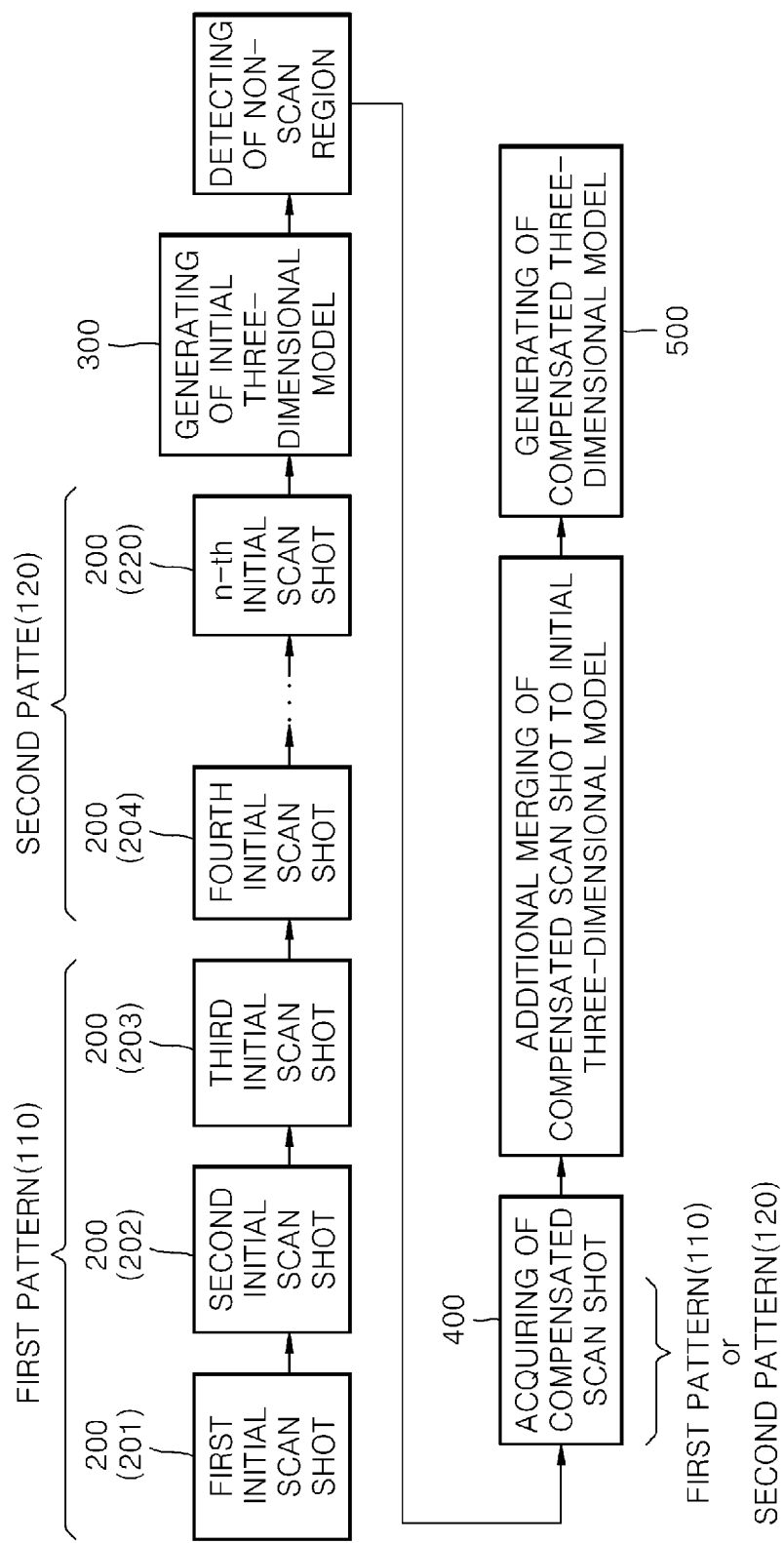
FIG. 10 is a diagram that is referred to for description of a process of generating a compensated three-dimensional model in a method of compensating data according to a second embodiment of the present disclosure.
Figure 11:
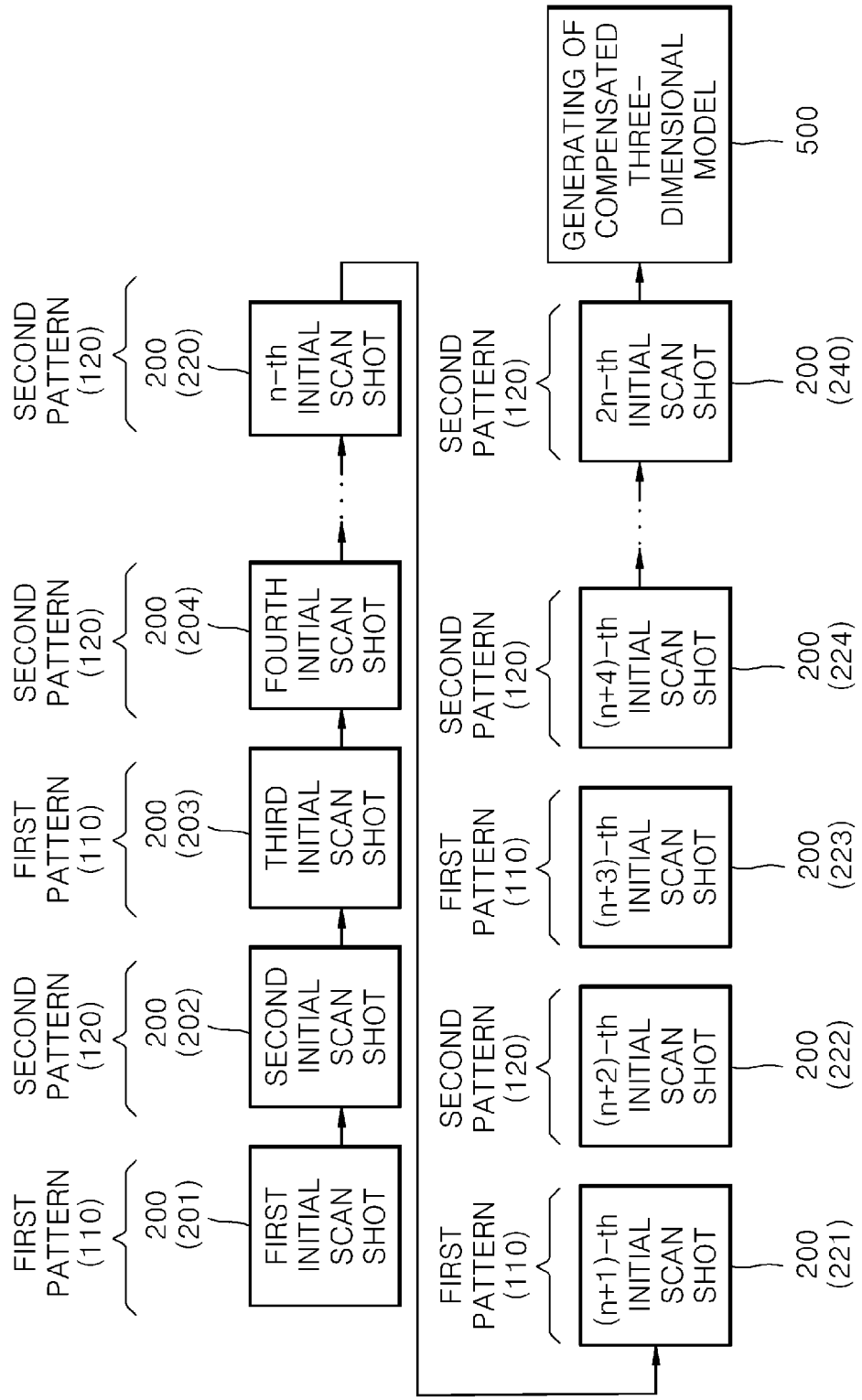
FIG. 11 is a diagram that is referred to for description of a process of generating a compensated three-dimensional model in a method of compensating data according to a third embodiment of the present disclosure.
Figure 12:
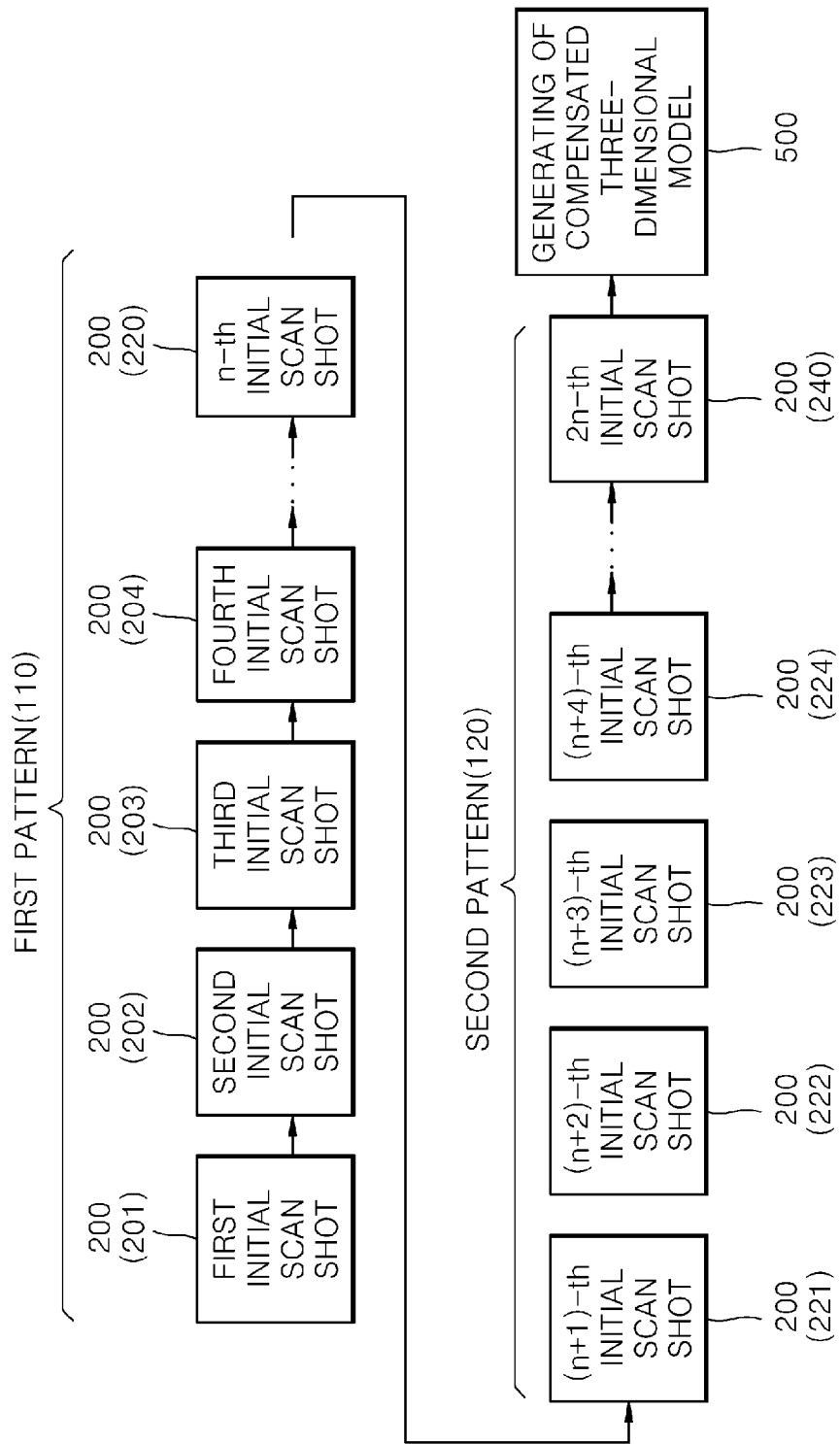
FIG. 12 is a diagram that is referred to for description of a process of generating a compensated three-dimensional model in a method of compensating data according to a fourth embodiment of the present disclosure.
Figure 13:
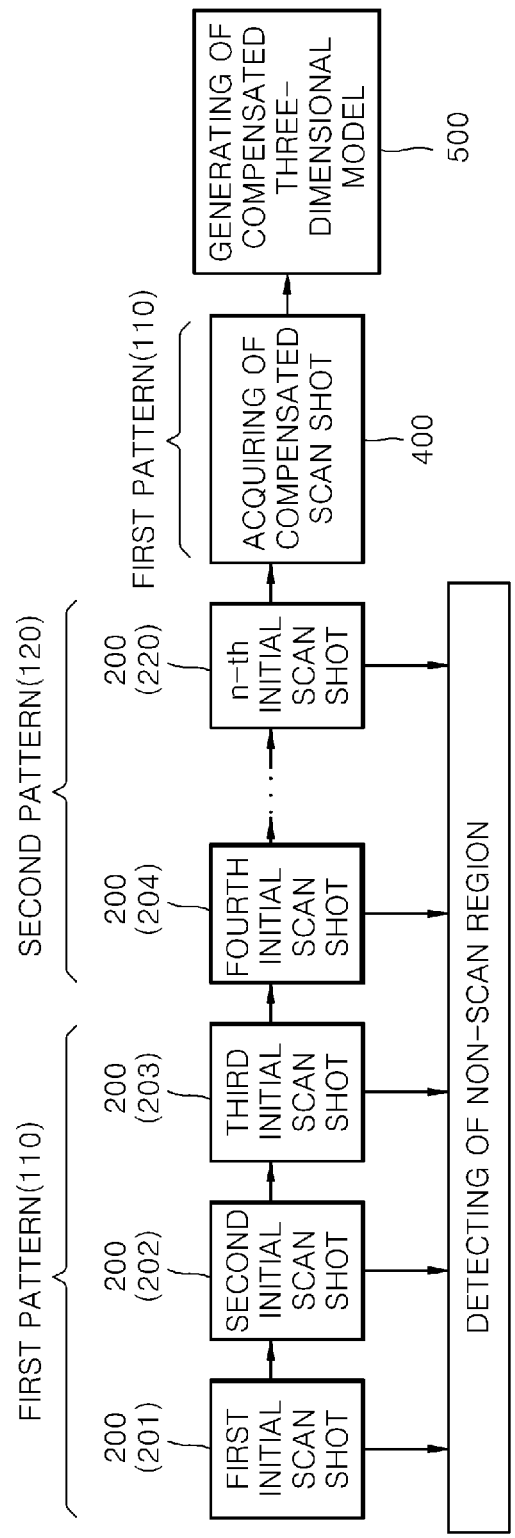
FIG. 13 is a diagram that is referred to for description of a process of generating a compensated three-dimensional model in a method of compensating data according to a fifth embodiment of the present disclosure.

FIG. 9 is a diagram that is referred to for description of a process of generating a compensated three-dimensional model 500 in a method of compensating data according to a second embodiment of the present disclosure. FIG. 10 is a diagram that is referred to for description of a process of generating a compensated three-dimensional model 500 in a method of compensating data according to a third embodiment of the present disclosure. FIG. 11 is a diagram that is referred to for description of a process of generating a compensated three-dimensional model 500 in a method of compensating data according to a fourth embodiment of the present disclosure. FIG. 12 is a diagram that is referred to for description of a process of generating a compensated three-dimensional model 500 in a method of compensating data according to a fifth embodiment of the present disclosure. FIG. 13 is a diagram that is referred to for description of a process of generating a compensated three-dimensional model 500 in a method of compensating data according to a sixth embodiment of the present disclosure.

The process of generating the compensated three-dimensional model 500 in the method of compensating data according to the second embodiment will be described with reference to FIG. 9. First, in Step S110 of performing initial scanning, the three-dimensional scanner 910 may acquire a total of n (n is an integer that is equal to or greater than 2) initial scan shots 200. As an example, the plurality of initial scan shots 200 that are acquired in Step S110 of performing initial scanning may be acquired in a state where the first pattern 110 is projected onto the target object O by the optical projector 911 of the three-dimensional scanner 910. More specifically, in the state where the first pattern 110 is projected onto the target object O, the first initial scan shot 201 is acquired by scanning the first portion of the target object O from the first angle. Then, the second initial scan shot 202 is acquired by scanning the second portion of the target object O from the second angle. Then, the third initial scan shot 203 is acquired by scanning the third portion of the target object O from the third angle. Then, the fourth initial scan shot 204 is acquired by scanning the fourth portion of the target object O from the fourth angle. In this manner, the n-th initial scan shot 220 is acquired by scanning the n-th portion of the target object O from the n-th angle.

When the n initial scan shots 200 are acquired, the alignment unit 923 and the three-dimensional modeling unit 924 of the control unit 920 may align and merge the initial scan shots 200 and thus may generate the initial three-dimensional model 300. As an example, the initial three-dimensional model 300 may be generated on the basis of the initial scan shots 200 acquired in a state where the first pattern 110 is projected onto all portions of the target object O.

Subsequently, the non-scan region u may be detected in the initial three-dimensional model 300. In addition, if the non-scan region u is detected in the initial three-dimensional model 300, the initial scan shot subject to compensation in which the non-scan region u is present may be determined. For convenience in description, it is assumed that the first initial scan shot 201 is determined as the initial scan shot subject to compensation. Under the control of the three-dimensional scanner controller 922 of the control unit 920, in order to acquire a compensated scan shot 400, the three-dimensional scanner 910 may scan the first portion of the target object O from the same first angle as when the first initial scan shot 201 is acquired. When acquiring the compensated scan shot 400, the second pattern 120 different from the first pattern 110 projected when acquiring the first initial scan shot 201 may be projected onto the target object O. That is, at least one compensated scan shot 400 that is acquired in Step S130 of performing compensative scanning may be acquired by projecting the second pattern 120 different from the first pattern 110.

When the compensated scan shot 400 is acquired, the three-dimensional modeling unit 924 of the control unit 920 may additionally merge the compensated scan shot to the initial three-dimensional model 300 and thus may generate the compensated three-dimensional model 500. The non-scan region u of the initial three-dimensional model 300 generated with the first pattern 110 is minimized with the compensated scan shot 400. Therefore, a completion level of the compensated three-dimensional model 500 can be improved. Accordingly, the user can design an orthodontic treatment object on the basis of the precisely compensated three-dimensional model 500 and can provide an optimal treatment to the patient.

The process of generating the compensated three-dimensional model 500 in the method of compensating data according to the third embodiment will be described with reference to FIG. 10. The plurality of initial scan shots 200 that are acquired in Step S110 of performing initial scanning may be acquired in a state where the first pattern 110 and the second pattern 120 are projected onto the target object O. As an example, the three-dimensional scanner 910 may acquire at least one of the plurality of initial scan shots 200 in the state where the first pattern 110 is projected onto the target object O and may acquire the others of the plurality of initial scan shots 200 in a state where the second pattern 120 having a different shape than the first pattern 110 is projected onto the target object O. As an example, the first initial scan shot 201 may be acquired by scanning the first portion of the target object O from the first angle in the state where the first pattern 110 is projected onto the target object O, and the second initial scan shot 202 may be acquired by scanning the second portion of the target object O from the second angle in the state where the first pattern 110 is projected onto the target object O. Moreover, the third initial scan shot 203 may be acquired by scanning the third portion of the target object O from the third angle in the state where the first pattern 110 is projected onto the target object O. Then, the fourth initial scan shot 204 may be acquired by scanning the fourth portion of the target object O from the fourth angle in a state where the second pattern 120 is projected onto the target object O. In this manner, the n-th initial scan shot 220 may be acquired by scanning the n-th portions of the target object O from the n-th angle in the state where the second pattern 120 is projected onto the target object O.

When the initial three-dimensional model 300 is generated on the basis of the initial scan shots 200, the non-scan region detection unit 925 may detect the non-scan region u of the initial three-dimensional model 300 and may determine the initial scan shot subject to compensation that includes the image of the compensation recommendation portion corresponding to the non-scan region u. As an example, when it is assumed that the initial scan shot subject to compensation is the first initial scan shot 201, under the control of the three-dimensional scanner controller 922 of the control unit 920, in order to acquire the compensated scan shot 400, the three-dimensional scanner 910 may scan the first portion of the target object O from the same first angle as when the first initial scan shot 201 is acquired. When acquiring the compensated scan shot 400, the second pattern 120 different from the first pattern 110 projected when acquiring the first initial scan shot 201 may be projected onto the target object O. That is, at least one compensated scan shot 400 that is acquired in Step S130 of performing compensative scanning may be acquired by projecting the second pattern 120 different from the first pattern 110.

As another example, when it is assumed that the initial scan shot subject to compensation is the fourth initial scan shot 204, under the control of the three-dimensional scanner controller 922 of the control unit 920, in order to acquire the compensated scan shot 400, the three-dimensional scanner 910 may scan the fourth portion of the target object O from the same fourth angle as when the fourth initial scan shot 204 is acquired. When acquiring the compensated scan shot 400, the first pattern 110 different from the second pattern 120 projected when acquiring the fourth initial scan shot 204 may be projected onto the target object O. That is, at least one compensated scan shot 400 that is acquired in Step S130 of performing compensative scanning may be acquired by projecting the first pattern 110 different from the second pattern 120.

When the compensated scan shot 400 is acquired, the compensated scan shot may be additionally merged to the initial three-dimensional model 300, and thus the compensated three-dimensional model 500 may be generated. The non-scan region u of the initial three-dimensional model 300 generated with the first pattern 110 may be minimized with the compensated scan shot 400 acquired by scanning the target object O onto which the second pattern 120 is projected. The non-scan region u of the initial three-dimensional model 300 generated with the second pattern 120 may be minimized with the compensated scan shot 400 acquired by scanning the target object O onto which the first pattern 110 is projected. Accordingly, the completion level of the compensated three-dimensional model 500 can be improved. The user can design the orthodontic treatment object on the basis of the precisely compensated three-dimensional model 500 and can provide the optimal treatment to the patient.

The process of generating the compensated three-dimensional model 500 in the method of compensating data according to the fourth embodiment is described with reference to FIG. 11. Unlike in the above-described method of compensating data according to the second embodiment and the above-described method of compensating data according to the third embodiment, in the method of compensating data according to the fourth embodiment, the three-dimensional scanner 910 may acquire 2n initial scan shots 200 in Step S110 of performing initial scanning. As an example, the first initial scan shot 201 may be acquired by scanning the first portion of the target object O onto which the first pattern 110 is projected, from the first angle, and the second initial scan shot 202 may be acquired by scanning the first portion of the target object O onto which the second pattern 120 is projected, from the first angle. That is, the first initial scan shot 201 and the second initial scan shot 202 may be acquired by scanning the same portion of the target object O from the same angle, but projecting different patterns 100 onto the same portion of the target object O. In the same manner, the third initial scan shot 203 may be acquired by scanning the second portion of the target object O onto which the first pattern 110 is projected, from the second angle, and the fourth initial scan shot 204 may be acquired by scanning the second portion of the target object O onto which the second pattern 120 is projected, from the second angle.

In this manner, the first initial scan shot 201 and the second initial scan shot 202 may constitute a pair, and the third initial scan shot 203 and the fourth initial scan shot 204 may constitute a pair. In the same manner, an (n+1)-th initial scan shot 221 and an (n+2)-th initial scan shot 222 may constitute a pair, and an (n+3)-th initial scan shot 223 and an (n+4)-th initial scan shot 224 may constitute a pair. Accordingly, the 2n initial scan shots 200 may be acquired by scanning n portions of the target object O onto each of which the first pattern 110 and the second pattern 120 are projected. In the present embodiment, the alignment unit 923 and the three-dimensional modeling unit 924 of the control unit 920 may align and merge the initial scan shots 200 and thus may generate the compensated three-dimensional model 500. Step S120 of detecting a non-scan region and Step S130 of performing compensative scanning may be omitted.

The process of generating the compensated three-dimensional model 500 in the method of compensating data according to the fifth embodiment will be described with reference to FIG. 12. Like in the above-described method of compensating data according to the fourth embodiment, in the method of compensating data according to the fifth embodiment, the three-dimensional scanner 910 may acquire the 2n initial scan shots 200 in Step S110 of performing initial scanning. As an example, the first to n-th initial scan shots, for example, the initial scan shots 201, 202, 203, 204, and so forth up to 220, may be acquired by scanning the n portions of the target object O onto which the first pattern 110 is projected, from the n angles, respectively. (n+1)-th to 2n-th initial scan shots, for example, the initial scan shots 221, 222, 223, 224, and so forth up to 240, may be acquired by scanning the n portions of the target object O onto which the second pattern 120 is projected, from the n angles, respectively. That is, the first initial scan shot 201 and the (n+1)-th initial scan shot 221 may be acquired by scanning the same portions of the target object O onto which different pattern 100 are projected, from the same angles, respectively. In the same manner, the second initial scan shot 202 may be acquired by scanning the second portion of the target object O onto which the first pattern 110 is projected, from the second angle, and the (n+2)-th initial scan shot 222 may be acquired by scanning the second portion of the target object O onto which the second pattern 120 is projected, from the second angle.

In this manner, the first initial scan shot 201 and the (n+1)-th initial scan shot 221 may constitute a pair, and the second initial scan shot 202 and the (n+2)-th initial scan shot 222 may constitute a pair. In the same manner, the third initial scan shot 203 and the (n+3)-th initial scan shot 223 may constitute a pair, and the fourth initial scan shot 204 and the (n+4)-th initial scan shot 224 may constitute a pair. Accordingly, the 2n initial scan shots 200 may be acquired by scanning the n portions of the target object O onto each of which the first pattern 110 and the second pattern 120 are projected. In the present embodiment, like in the above-described fourth embodiment, the alignment unit 923 and the three-dimensional modeling unit 924 of the control unit 920 may align and merge the initial scan shots 200 and thus may generate the compensated three-dimensional model 500. Step S120 of detecting a non-scan region and Step S130 of performing compensative scanning may be omitted.

The process of generating the compensated three-dimensional model 500 in the method of compensating data according to the sixth embodiment will be described below with reference to FIG. 13. Like in the method of compensating data according to the third embodiment, in the method of compensating data according to the sixth embodiment, the initial scan shots 200 may be acquired. As an example, at least one of the plurality of initial scan shots 200 may be acquired in the state where the first pattern 110 is projected onto the target object O, and the others of the plurality of initial scan shots 200 may be acquired in a state where the second pattern 120 having a different shape than the first pattern 110 is projected onto the target object O.

In the method of compensating data according to the sixth embodiment, the non-scan region u may be detected in each of the plurality of initial scan shots. As an example, when the first initial scan shot 201 is acquired, the non-scan region detection unit 925 of the control unit 920 may detect whether or not the non-scan region u is present in the first initial scan shot 201. In addition, when the second initial scan shot 202 is acquired, it may be detected whether or not the non-scan region u is present in the second initial scan shot 202.

As another example, in the method of compensating data according to the sixth embodiment, when the first to n-th initial scan shots, for example, the initial scan shots 201, 202, 203, 204, and so forth up to 220, are acquired, the non-scan region detection unit 925 may detect whether or not the non-scan region u is present in the initial scan shots 200.

That is, in the method of compensating data according to the sixth embodiment, the non-scan region detection unit 925 may detect the non-scan region u in the initial scan shots 200 in a state where the three-dimensional modeling unit 924 does not generate the initial three-dimensional model 300. Therefore, the system resource and the time that are required to generate the initial three-dimensional model 300 can be saved.

As an example, when the initial scan shot subject to compensation that includes the image of the compensation recommendation portion corresponding to the non-scan region u is determined as the fourth initial scan shot 204, in order to acquire the compensated scan shot 400, under the control of the three-dimensional scanner controller 922, the three-dimensional scanner 910 may scan the fourth portion of the target object O from the same fourth angle as when the fourth initial scan shot 204 is acquired. When acquiring the compensated scan shot 400, the first pattern 110 different from the second pattern 120 projected when acquiring the fourth initial scan shot 204 may be projected onto the target object O. That is, at least one compensated scan shot 400 that is acquired in Step S130 of performing compensative scanning may be acquired by projecting the first pattern 110 different from the second pattern 120.

When the compensated scan shot 400 is acquired, the three-dimensional modeling unit 924 of the control unit 920 may merge the plurality of initial scan shots 200 and the compensated scan shot 400 together and thus may generate the compensated three-dimensional model 500 representing the target object O. The non-scan region u generated with the first pattern 110 may be minimized with the compensated scan shot 400 acquired by scanning the target object O onto which the second pattern 120 is projected, and the non-scan region u of the initial three-dimensional model 300 that is generated with the second pattern 120 may be minimized with the compensated scan shot 400 acquired by scanning the target object O onto which the first pattern 110 is projected. Accordingly, the completion level of the compensated three-dimensional model 500 can be improved. The user can design the orthodontic treatment object on the basis of the precisely compensated three-dimensional model 500 and can provide the optimal treatment to the patient.

A system for compensating data, the system for performing the method of compensating data according to the present disclosure, will be described below. A portion of the above description of the method of compensating data, when associated with description of the system for compensating data, may be briefly repeated or omitted.

Figure 14:
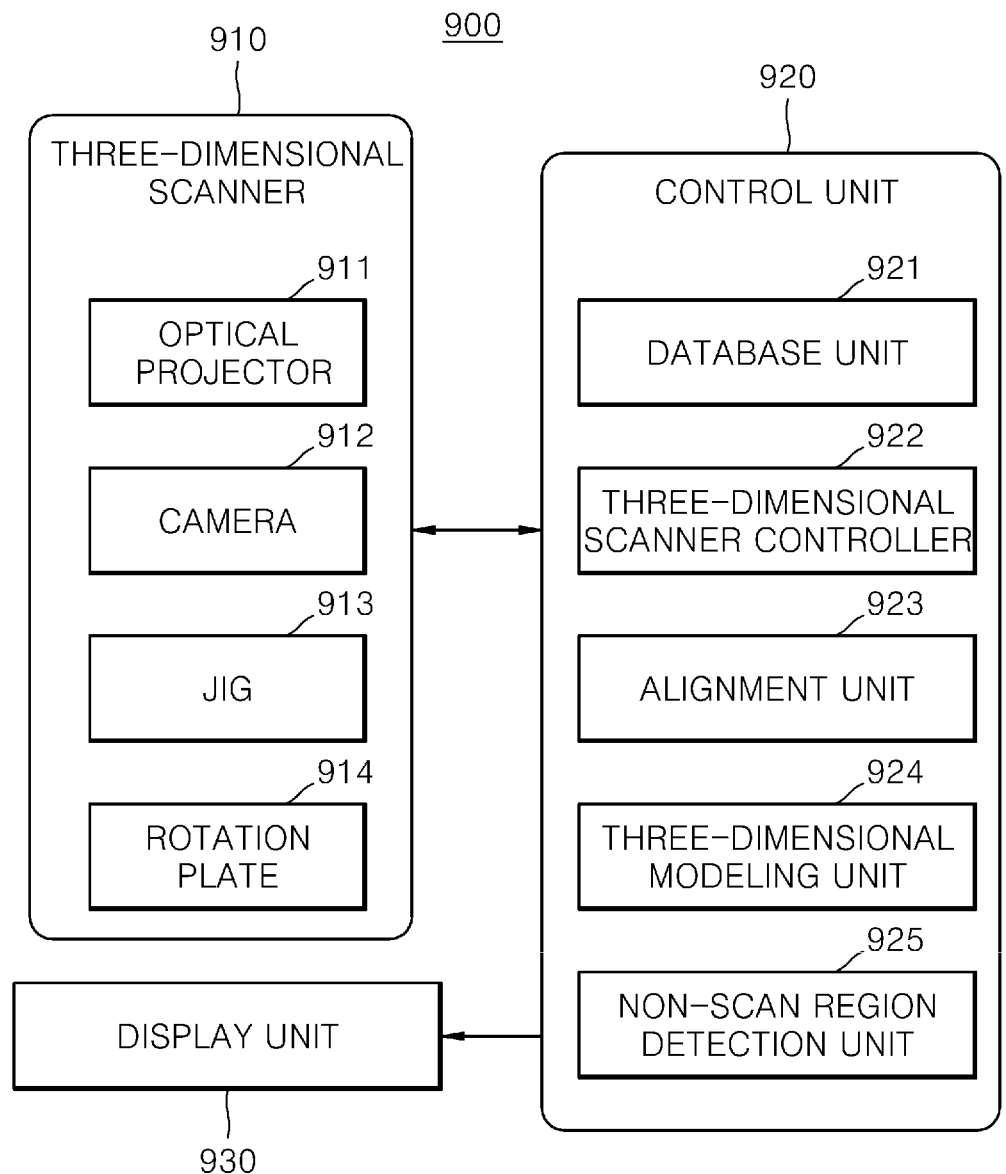
FIG. 14 is a diagram illustrating a schematic configuration of a system for compensating data, the system for performing the method of compensating data according to the present disclosure.

FIG. 14 is a diagram illustrating a schematic configuration of a system 900 for compensating data, the system for performing the method of compensating data according to the present disclosure.

With reference to FIG. 14, the system 900 for compensating data, the system for performing the method of compensating data according to the present disclosure may include the three-dimensional scanner 910, the control unit 920, and a display unit 930.

The three-dimensional scanner 910 may include a table-type scanner on which the target object O is placed at a predetermined position and which acquires the three-dimensional model representing the target object O by rotating and/or tilting the target object O. The three-dimensional scanner 910 may be installed at a predetermined place. A change in a distance between a camera 912 of the three-dimensional scanner 910 and the target object O is small. Thus, scan shots acquired at a uniform distance from the target object O may be easily merged, and a three-dimensional model may be generated.

The control unit 920 may be configured to perform data computation. As an example, the control unit 920 may be a computation device including a microprocessor. The control unit 920 may be at least one of general-purpose computation devices including a desktop PC, a tablet PC, and a local server. In addition, the control unit 920 may be a cloud control unit.

The control unit 920 may be connected to the three-dimensional scanner 910 in a wired or wireless way in such a manner as to possibly perform data communication therewith. The control unit 920 may receive scan shots resulting from scanning by the three-dimensional scanner 910 and may generate a three-dimensional model by merging the scan shots. In addition, the control unit 920 may control the three-dimensional scanner 910 in such a manner that the optical projector 911 of the three-dimensional scanner 910 projects a pattern or that the camera 912 at a specific position operates. In addition, the control unit 920 may detect the non-scan region u in the initial three-dimensional model or the plurality of initial scan shots and may control rotating and tilting of a jig on which the target object O is placed to acquire the compensated scan shot. As an example, the control unit 920 may control the three-dimensional scanner 910 and thus may adjust a direction and an angle of the target object O with respect to at least one camera 912.

A configuration of each constituent elements of the system 900 for compensating data will be described in detail below.

The three-dimensional scanner 910 may project a predetermined pattern onto the target object O and may acquire a plurality of initial scan shots representing the target object O and at least one compensated scan shot. As an example, the three-dimensional scanner 910 may include the optical projector 911 that projects a pattern onto a surface of the target object.

The optical projector 911 may include a light source that emits light and a pattern generation unit that forms a predetermined pattern when the light passing through the pattern generation unit is emitted to the surface of the target object O. The pattern generation unit may be at least one of pattern generation elements that include a pattern mask and a DMD. Through the light source and the pattern generation unit, the optical projector 911 may project at least two patterns onto the surface of the target object O.

However, in order to project at least two patterns onto the surface of the target surface O, the optical projector 911 may generate a single pattern or a plurality of patterns. That is, although a single pattern is generated, the optical projector 911 may rotate the single pattern in one direction. In a fixed state, the optical projector 911 may generate at least two patterns through transformation by the pattern generation unit.

In addition, the three-dimensional scanner 910 may include at least one camera 912. The camera 912 receives light through a lens, and the light may be generated into a scan shot through a built-in image sensor. The image sensor may be a CCD sensor or at least one of existing image sensing devices that include a CMOS sensor.

More specifically, the camera 912 may be arranged on one side of the optical projector 911, and the camera 912 may acquire the plurality of initial scan shots and at least one compensated scan shot by scanning the target object onto which the optical projector 911 projects the predetermined pattern. An arrangement relationship between the camera 912 and the optical projector 911 will be described below.

In addition, the three-dimensional scanner 910 may include a jig 913 for placing the target object O. As an example, the jig 913 may place the target object O on a flat tray, and the jig 913 may move the target object O in a straight line and/or may rotate the target object O. As an example, the jig 913 may move the target object O in a straight line in at least one of an upward-downward direction, a leftward-rightward direction, and a forward-backward direction. As another example, the jig 913 may rotate the target object O, in one direction, about the Z-axis direction. As still another example, the jig 913 may tilt the target object O in one direction. In this manner, the jig 913 on which the target object O is placed may move the target object O in a straight line, may rotate the target object O, and/or may tilt the target object O. Therefore, the object O can be scanned from various angles with respect to the camera 912, and the three-dimensional model at a high completion level can be acquired.

A process of additionally scanning a compensation recommendation portion C when the jig 913 of the three-dimensional scanner 910 is rotated and tilted and then the target object O is scanned will be described.

FIGS. 15A, 15B, and 15C are views that are referred to for description of the compensation recommendation portion C of the target object O that corresponds to the non-scan region u when the jig 913 of the three-dimensional scanner 910 that constitutes the system 900 for compensating data according to the present disclosure is moved. FIGS. 16A and 16B are views that are referred to for description of the process of additionally scanning the compensation recommendation portion C of the target object O.

With reference to FIGS. 14, 15A, 15B, and 15C, the jig 913 of the three-dimensional scanner 910 may move the target object O in a straight line and may rotate and tilt the targe oject O in such a manner as to have various angles with respect to the camera 912. With reference to FIG. 15A, the camera 912 may acquire the first initial scan shot by scanning the first portion of the target object O from the first angle. With reference to FIG. 15B, the camera 912 of the three-dimensional scanner 910 may acquire the second initial scan shot by scanning the second portion of the target object O from the second angle. In addition, with reference to FIG. 15C, the camera 912 may acquire the third initial scan shot by scanning the third portion of the target object O from the third angle. At this point, it is assumed that the non-scan region occurs with the second scan shot and that the first to third scan shots are all acquired in a state where the first pattern is projected onto the target object O. On this assumption, the initial scan shot subject to compensation is the second scan shot. There is a need to compensate for the non-scan region by additionally scanning the compensation recommendation portion of the target object O.

With reference to FIGS. 14, 16A, and 16B, the control unit 920 may control the jig 913 on which the target object O is placed, in such a manner as to rotate or tilt the target object O, and the three-dimensional scanner 910 may acquire the compensated scan shot by additionally scanning the compensation recommendation portion C of the target object O.

With reference to FIG. 16A, the control unit 920 may control the jig 913 in such a manner that the camera 912 scans the fourth portion of the target object O from the fourth angle so that the compensation recommendation portion C of the target object O is viewed more properly from the camera 912. At this point, a pattern that is projected onto the target object O may be any one of the first pattern and the second pattern different from the first pattern. Accordingly, the compensated scan shot may be acquired, and the compensated three-dimensional model may be generated through the compensated scan shot. Thus, the non-scan region may be minimized.

With reference to FIG. 16B, the control unit 920 may control the jig 913 in such a manner that the camera 912 scans the second portion of the target object O from the second angle so that the compensation recommendation portion C of the target object O is scanned using a different pattern. However, at this point, a pattern that is projected onto the target object O may be the second pattern different from the first pattern. Accordingly, the compensated scan shot may be acquired, and the compensated three-dimensional model may be generated through the compensated scan shot. Thus, the non-scan region may be minimized. As illustrated in FIG. 16B, in a case where the compensated scan shot is acquired, there is no need to determine a new angle for compensating for the non-scan region. The control unit 920 controls the jig 913 in such a manner that the second portion of the target object O is scanned from the second angle with respect to the camera 912. Thus, the advantage of possibly quickly performing compensative scan on the target object O can be achieved. In addition, because a plurality of different patterns are used for the compensation recommendation portion C, the advantage of stably compensating for the non-scan region occurring with any one pattern using the compensated scan shot acquired by projecting another pattern can be achieved.

Particularly, the non-scan region may be generated along a stripe-extending direction of the pattern. Therefore, the compensation recommendation portion corresponding to the initial scan shot acquired in the state where the first pattern is projected onto the target object O may be compensated by acquiring the compensated scan shot. The complemented scan shot may be acquired by scanning the target object O in the same direction and from the same angle as when the initial scan shot is acquired, in a state where the second pattern is projected onto the target object O.

Various arrangement relations among the optical projector 911 and the camera 912 will be described below.

Figure 17A:
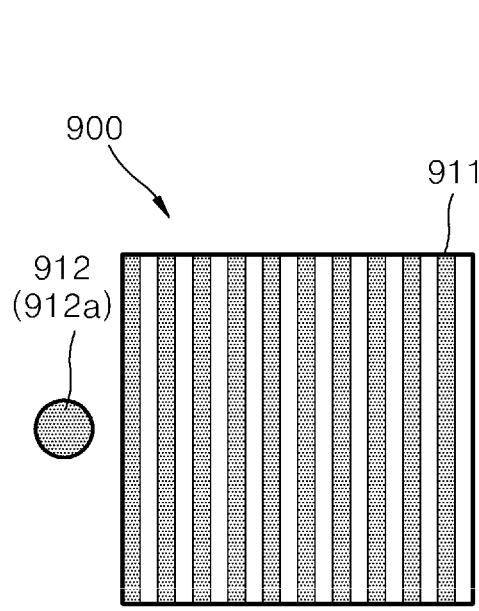
FIGS. 17A and 17B are views that are referred to for description of a first arrangement relationship between an optical projector and a camera of the three-dimensional scanner that constitutes the system for compensating data according to the present disclosure.
Figure 17B:
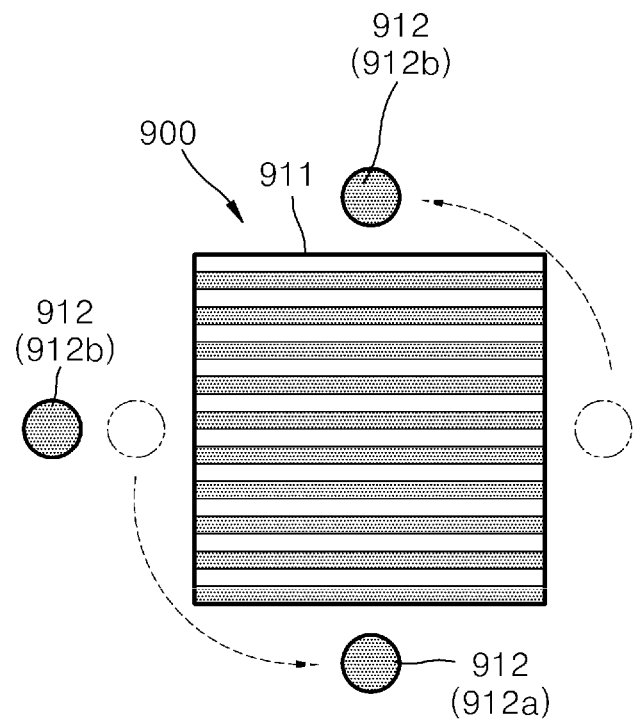
Figure 18:
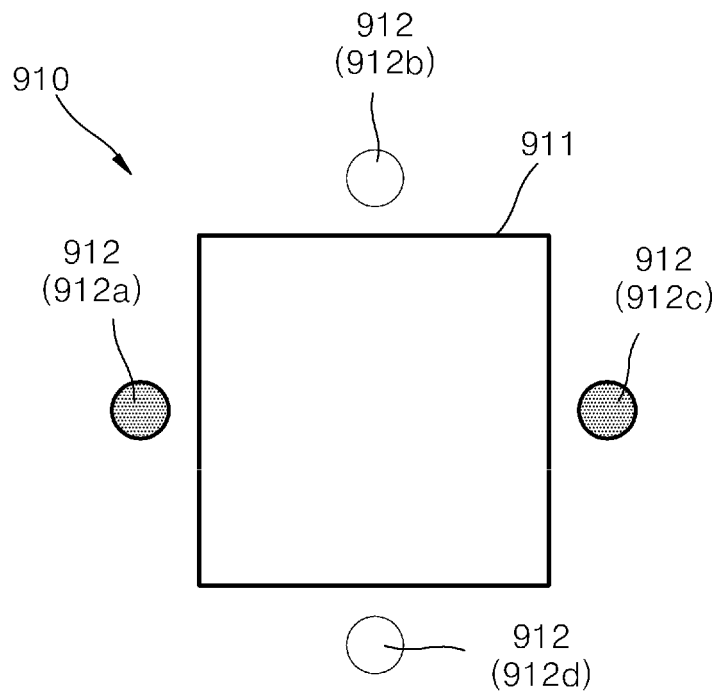
FIG. 18 is a view that is referred to for description of a second arrangement relationship between the optical projector and the camera of the three-dimensional scanner that constitutes the system for compensating data according to the present disclosure.
Figure 19A:
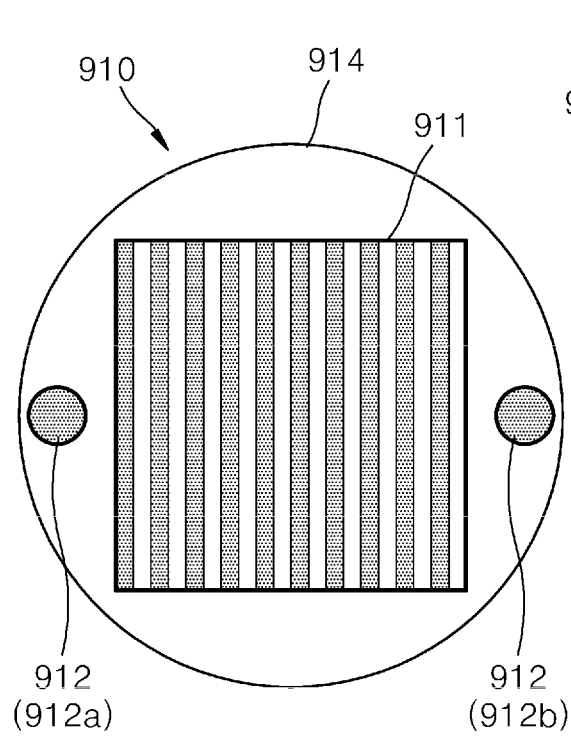
FIGS. 19A and 19B are views that are referred to for description of a third arrangement relationship between the optical projector and the camera of the three-dimensional scanner that constitutes the system for compensating data according to the present disclosure.
Figure 19B:
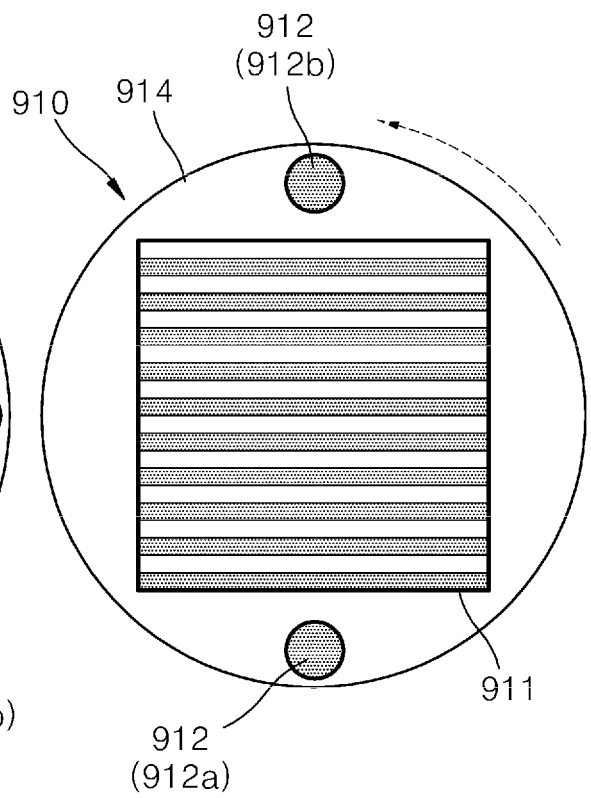

FIGS. 17A and 17B are views that are referred to for description of a first arrangement relationship between the optical projector 911 and the camera 912 of the three-dimensional scanner 910 that constitutes the system 900 for compensating data according to the present disclosure. FIG. 18 is a view that is referred to for description of a second arrangement relationship between the optical projector 911 and the camera 912 of the three-dimensional scanner 910 that constitutes the system 900 for compensating data according to the present disclosure. FIGS. 19A and 19B are views that are referred to for description of a third arrangement relationship between the optical projector 911 and the camera 912 of the three-dimensional scanner 910 that constitutes the system 900 for compensating data according to the present disclosure.

With reference to FIGS. 14 and 17A to 19B, one pair of cameras 912 may be provided. As an example, the cameras 912 constituting one pair may be a first camera 912a and a second camera 912b that are arranged between the optical projector 911 in between. The first camera 912a is arranged adjacent to one side of the optical projector 911. The second camera 912b is arranged adjacent to the other side of the optical projector 911 that faces the one side thereof.

At least one camera 912 may be arranged in a direction vertical to the stripe-extending direction of the pattern generated by the optical projector 911 in order to easily acquire the depth information of the target object O with the projection of the pattern by the optical projector 911. As illustrated in FIG. 17A, the optical projector 911 may generate a pattern having the shape of vertical stripes. That is, the stripe-extending direction of the pattern generated by the optical projector 911 is the upward-downward direction, and the camera 912 may be arranged in the leftward-rightward direction vertical to the stripe-extending direction of the pattern. In addition, as illustrated in FIG. 17B, in a case where the optical projector 911 generates the pattern having the shape of vertical stripes, the stripe-extending direction of the pattern generated by the optical projector 911 is the leftward-rightward direction, and the camera 912 may be arranged in the upward-downward direction vertical to the stripe-extending direction of the pattern. Particularly, in a case where a pair of cameras 912 is provided, the pattern for each of the cameras 912 arranged in the direction vertical to the stripe-extending direction of the pattern may be precisely aligned. Therefore, the advantage of possibly easily acquiring the depth information of the target object O and possibly acquiring the precise three-dimensional model (the initial three-dimensional model or the compensated three-dimensional model) can be achieved.

In the first arrangement relationship, the optical projector 911 may generate and project at least two patterns. As an example, the optical projector 911, as illustrated in FIG. 17A, may generate and project the first pattern (for example, the vertical stripe pattern) and, as illustrated in FIG. 17B, may generate and project the second pattern (for example, the horizontal stripe pattern).

At this point, when the shape of the pattern generated by the optical projector 911 changes, one pair of cameras 912a and 912b can be rotated to a predetermined angle in order to be arranged in the direction vertical to the stripe-extending direction of the pattern. As an example, the three-dimensional scanner 910 may further include a rotation plate 914. The rotation plate 914 may rotate at least one camera 912 in one direction. The rotation plate 914 may be arranged to come into contact with bottom surfaces of the first camera 912a and the second camera 912b and thus may rotate the first camera 912a and the second camera 912b in one direction at the same time. Therefore, although a pattern that is generated by the optical projector 911 changes, one pair of cameras 912a and 912b are rotatable. Thus, the depth information of the target object O may be easily acquired, and the precise three-dimensional model may be acquired.

In addition, in the second arrangement relationship between the optical projector 911 and the camera 912 as illustrated in FIG. 18, two pairs of cameras 912 may be provided. As an example, cameras 912 that constitute two pairs may be the first camera 912a, the second camera 912b, a third camera 912c, and a fourth camera 912d that are arranged with the optical projector 911 in the middle thereof. The first camera 912a is arranged adjacent to a first side of the optical projector 911. The second camera 912b is arranged adjacent to a second side of the optical projector 911. The third camera 912c is arranged adjacent to a third side of the optical projector 911 that faces the first side thereof. The fourth camera 912d is arranged adjacent to a fourth side of the optical projector 911 that faces the second side thereof. In this case, the first camera 912a and the third camera 912c may constitute one pair, and the second camera 912b and the fourth camera 912d may constitute the other pair.

As an example, when the optical projector 911 generates and projects the first pattern (for example, the vertical stripe pattern) having a first stripe-extending direction (for example, the upward-downward direction), the first camera 912a and the third camera 912c that are arranged vertically to the stripe-extending direction of the first pattern may be activated and thus may scan the target object O. Moreover, when the optical projector 911 generates and projects the second pattern (for example, the horizontal stripe pattern) having a second stripe-extending direction (for example, the leftward-rightward direction), the second camera 912b and the fourth camera 912d that are arranged vertically to the stripe-extending direction of the second pattern may be activated and thus may scan the target object O. When the cameras 912 arranged vertically to the stripe-extending direction of the pattern generated by the optical projector 911 are activated as described above, the advantage of possibly easily acquiring the plurality of initial scan shots and at least one compensated scan shot can be achieved.

In addition, in the third arrangement relationship between the optical projector 911 and the camera 912, the optical projector 911 as illustrated in FIGS. 19A and 19B may generate a single pattern. Although the optical projector 911 generates a single pattern, the stripe-extending direction of the pattern projected by the optical projector 911 has to be changed in order to project at least two patterns onto the target object O. Therefore, the optical projector 911 may project at least two patterns by being rotated in one direction with respect to the target object O. When the optical projector 911 generating a single pattern, as described above, is rotated in one direction with respect to the target object O, at least two patterns may be projected onto the target object O although only one pattern is generated by the optical projector 911. Thus, the compensated three-dimensional model in which the non-scan region is minimized may be acquired.

In order to rotate the optical projector 911 in one direction with respect to the target object O, the rotation plate 914 may rotate the optical projector 911 and at least one camera 912 together. As an example, when the optical projector 911 projects the first pattern (for example, the vertical stripe pattern) that has a stripe-extending direction that is the same as the upward-downward direction, the first camera 912a and the second camera 912b that are arranged vertically to the stripe-extending direction of the first pattern may scan the target object O. When the second pattern (for example, the horizontal stripe pattern) different from the first pattern is projected onto the target object O, the rotation plate 914 may rotate the optical projector 911 and the camera 912 in a clockwise or counterclockwise direction. Thus, the second pattern can be realized. In this case, the first camera 912a and the second camera 912b are arranged in a direction vertical to the leftward and rightward direction that is the same as the stripe-extending direction of the second pattern. Accordingly, in the three-dimensional scanner 910 projecting a single pattern, with rotational operation of the rotation plate 914, at least two different pattern may also be projected onto the target object O. The user can advantageously acquire the compensated three-dimensional model at a high completeness level in which the non-scan region that is possibly generated along the stripe-extending direction of the pattern is minimized.

A detailed configuration of the control unit 920 will be described below.

The control unit 920 may include a database unit 921. The database unit 921 may be at least one of general-purpose storage devices that include a hard disk drive, a solid state drive, and a flash drive. The plurality of initial scan shots and at least one compensated scan shot that are acquired while the three-dimensional scanner 910 performs scanning may be stored in the database unit 921. Stored in the database unit 921 may be various logics that include a logic for aligning the scan shots, a logic for detecting the non-scan region, a three-dimensional modeling logic, and a logic for controlling the three-dimensional scanner 910.

The control unit 920 may include the three-dimensional scanner controller 922. In Step S110 of performing initial scanning, the three-dimensional scanner controller 922 may control the jig 913 in order to arrange the target object O to a predetermined angle. In addition, in Step S110 of performing initial scanning, the three-dimensional scanner controller 922 may control the pattern projected by the optical projector 911 on the target object O when acquiring the plurality of initial scan shots. In addition, in Step S110 of performing initial scanning, the three-dimensional scanner controller 922 may activate at least one camera 912 for operation when acquiring the plurality of initial scan shots. In addition, in Step S130 of performing compensative scanning, the three-dimensional scanner controller 922 may control operation of each of the optical projector 911, the camera 912, the jig 913, and the rotation plate 914 in order to acquire at least one compensated scan shot.

The control unit 920 may include the alignment unit 923. The alignment unit 923 may align the plurality of initial scan shots and/or at least one compensated scan shot. A known data alignment technique may be used in order to align the plurality of initial scan shots and/or at least one compensated scan shot. As an example, the alignment unit 923 may align the plurality of initial scan shots and/or at least one compensated scan shot using an iterative closest point (ICP) technique, but is not necessarily limited to this technique.

The control unit 920 may include the three-dimensional modeling unit 924. The three-dimensional modeling unit 924 may merge the plurality of initial scan shot aligned and/or at least one compensated scan shot and thus may generate the three-dimensional model. As an example, the three-dimensional modeling unit 924 may merge the plurality of initial scan shots aligned and thus may generate the initial three-dimensional model. In addition, the three-dimensional modeling unit 924 may additionally merge at least one compensated scan shot to the already-generated initial three-dimensional model and thus may generate the compensated three-dimensional model. In addition, the three-dimensional modeling unit 924 may merge the plurality of initial scan shots and at least one compensated scan shot together and thus may generate the compensated three-dimensional model.

The control unit 920 may include the non-scan region detection unit 925. The non-scan region detection unit 925 may detect the non-scan region in the initial three-dimensional model generated by the three-dimensional modeling unit 924 or in the plurality of initial scan shots acquired by the three-dimensional scanner 910. In addition, the non-scan region detection unit 925 may determine the initial scan shot subject to compensation corresponding to the non-scan region. When the non-scan region detection unit 925 determines the initial scan shot subject to compensation, the three-dimensional scanner controller 922 may control the jig 913 of the three-dimensional scanner 910 in such a manner that the target object O is moved in a straight line, rotated, and tilted so that the compensation recommendation portion of the target object O that corresponds to the initial scan shot subject to compensation is clearly viewed, and the three-dimensional scanner 910 may acquire an additional compensated scan shot. The three-dimensional modeling unit 924 may generate the compensated three-dimensional model on the basis of the compensated scan shot acquired by the three-dimensional scanner 910.

Since the compensated three-dimensional model is generated in this manner, the user can design the precise orthodontic treatment object using the compensated three-dimensional model in which the non-scan region is minimized. Thus, the advantage of possibly providing an optimal treatment on the patient can be achieved.

The display unit 930 may visually display at least one portion of a control process performed by the control unit 920. As an example, the display unit 930 may be at least one of general-purpose visual display devices that include a monitor, a tablet screen, a touch screen, and a projection screen. Displayed on the display unit 930 may be visually a three-dimensional model (the three-dimensional model may include at least one of the initial three-dimensional model and the compensated three-dimensional model) of the target object O that is generated on the basis of the plurality of initial scan shots and at least one compensated scan shot that are acquired through the three-dimensional scanner 910. Accordingly, the user can easily check whether or not the three-dimensional model is precisely acquired, can design the orthodontic treatment object to be used in the patient's oral cavity using the three-dimensional model, and can provide the optimal treatment to the patient.

However, the technical idea of the present disclosure is described above only in an exemplary manner. It is apparent to a person of ordinary skill in the art to which the present disclosure pertains that various alterations and modifications are possibly made to the embodiments of the present disclosure without departing from the nature and gist of the present disclosure.

Therefore, the embodiments disclosed in the present specification are for describing, rather than limiting, the technical idea of the present disclosure and do not impose any limitation on the scope of the technical idea of the present disclosure. Accordingly, the scope of protection of the present disclosure should be defined by the following claims. All technical ideas that fall within the scope equivalent thereto should be interpreted to be included within the scope of the claims of the present disclosure.

DESCRIPTION OF REFERENCE NUMERALS

S110: step of performing initial scanning
S120: step of detecting a non-scan region
S130: step of performing compensative scanning
S131: step of determining initial scan shot subject to compensation
S132: step of setting a target object
S133: step of acquiring a can shot associated with a different pattern
S140: step of generating a compensated three-dimensional model
100: pattern 200: initial scan shot
300: initial three-dimensional model 400: compensated scan shot
500: compensated three-dimensional model
900: system for compensating data 910: three-dimensional scanner
920: control unit 930: display unit
HB: horizontal non-scan region VB; vertical non-scan region
O: target object C: compensation recommendation portion.

What is claimed is:

1. A method of compensating data, the method comprising:
acquiring, by a three-dimensional scanner, a plurality of initial scan shots by scanning a target object onto which a predetermined pattern including stripe pattern which has stripe-extending direction is projected;
detecting, by a control unit, a non-scan region on the basis of the plurality of initial scan shots; and
acquiring, by the three-dimensional scanner, at least one compensated scan shot by additionally scanning at least one portion of the target object when the non-scan region is detected by the control unit,
wherein the non-scan region is generated by the stripe-extending direction of the stripe pattern,
wherein in the acquiring by the three-dimensional scanner at least one compensated scan shot, in the state of setting the target object in the same direction and from the same angle as when the initial scan shot subject to compensation having the non-scan region, the compensated scan shot is acquired by projecting the stripe pattern which has different stripe-extending direction from the predetermined pattern projected in the acquiring by a three-dimensional scanner of the plurality of initial scan shots.

2. The method of claim 1, wherein the plurality of initial scan shots acquired in the acquiring by a three-dimensional scanner of the plurality of initial scan shots are acquired in a state where a first pattern is projected on the target object, and
wherein at least one compensated scan shot acquired in the acquiring by the three-dimensional scanner of at least one compensated scan shot is acquired by projecting a second pattern different from the first pattern.

3. The method of claim 1, wherein at least one of the plurality of initial scan shots acquired in the acquiring by a three-dimensional scanner of the plurality of initial scan shots is acquired in a state where a first pattern is projected onto the target object, and the others of the plurality of initial scan shots are acquired in a state where a second pattern different from the first pattern is projected onto the target object, and
wherein the acquiring by the three-dimensional scanner of at least one compensated scan shot comprises acquiring the compensated scan shot by projecting onto the target object a pattern different from a pattern projected when acquiring an initial scan shot subject to compensation that includes the non-scan region.

4. The method of claim 3, wherein at least one of portions of the target object that are represented by the plurality of initial scan shots, respectively, is different from the others, and at least one of angles with respect to the target object is different from the others.

5. The method of claim 3, wherein the acquiring by the three-dimensional scanner of at least one compensated scan shot further comprises:
determining, by the control unit, the initial scan shot subject to compensation that includes an image of a compensation recommendation portion corresponding to the non-scan region; and
setting, by the control unit, the target object in the same direction and from the same angle as when the initial scan shot subject to compensation is acquired, by operating the three-dimensional scanner.

6. The method of claim 1, wherein the non-scan region is detected in an initial three-dimensional model that is generated by merging the plurality of initial scan shots, and a compensated three-dimensional model representing the target object is generated by additionally merging the compensated scan shot to the initial three-dimensional model.

7. The method of claim 1, wherein the non-scan region is detected in each of the plurality of initial scan shots, and the compensated three-dimensional model representing the target object is generated by merging the plurality of initial scan shots and the compensated scan shot together.

8. A system for compensating data, the system for performing the method of compensating data according to claim 1, the system comprising:
a three-dimensional scanner comprising an optical projector and at least one camera arranged adjacent to one side of the optical projector and configured to acquire a plurality of initial scan shots and at least one compensated scan shot by the at least one camera scanning a target object onto which a predetermined pattern including stripe pattern which has stripe-extending direction is projected by the optical projector;
a control unit connected to the three-dimensional scanner and configured to adjust a direction and an angle of the target object with respect to the at least one camera by controlling the three-dimensional scanner; and
a display unit configured to display a three-dimensional model of the target object generated on the basis of the plurality of initial scan shots and at least one compensated scan shot that are acquired through the three-dimensional scanner, wherein the control unit determines the initial scan shot subject to compensation having the non-scan region which is generated by the stripe-extending direction of the stripe pattern, wherein in the state of setting the target object in the same direction and from the same angle as when the initial scan shot subject to compensation having the non-scan region, the compensated scan shot is acquired by projecting the stripe pattern which has different stripe-extending direction from the predetermined pattern projected in the acquiring by a three-dimensional scanner of the plurality of initial scan shots.

9. The system of claim 8, wherein the optical projector projects at least two patterns onto the target object.

10. The system of claim 9, wherein the optical projector generates and projects each of the at least two patterns.

11. The system of claim 9, wherein the optical projector, although generating a single pattern, projects the at least two patterns by being rotated in one direction with respect to the target object.

12. The system of claim 8, wherein the at least one camera is arranged in a direction vertical to a stripe-extending direction of the pattern generated by the optical projector.

13. The system of claim 12, wherein the cameras constituting one pair are provided with the optical projector in between, in such a manner as to be arranged adjacent to one side of the optical projector and the other side of thereof that faces the one side, respectively.

14. The system of claim 12, wherein a first camera of the cameras that are provided, with the optical projector in the middle thereof, is arranged adjacent to a first side of the optical projector, a second camera thereof is arranged adjacent to a second side thereof, a third camera thereof is arranged adjacent to a third side thereof facing the first side thereof, and a fourth camera thereof is arranged adjacent to a fourth side thereof facing the second side thereof, and wherein the first camera and the third camera are activated when the optical projector generates and projects a first pattern having a first stripe-extending direction, and the second camera and the fourth camera are activated when the optical projector generates and projects a second pattern having a second stripe-extending direction.

15. The system of claim 8, wherein the three-dimensional scanner further comprises a rotation plate rotating the at least one camera in one direction.

16. The system of claim 15, wherein the rotation plate rotates the optical projector in one direction, together with the at least one camera.

17. The system of claim 8, wherein the control unit controls a jig of the three-dimensional scanner on which the target object is placed, in such a manner that the three-dimensional scanner acquires the plurality of initial scan shots and the at least one compensated scan shot by rotating and tilting the target object.

* * * * *